(12) United States Patent
Weekes et al.

(10) Patent No.: US 11,148,852 B2
(45) Date of Patent: Oct. 19, 2021

(54) MODULAR AERIAL CARGO AERODYNAMIC ENCASEMENT

(71) Applicant: ELROY AIR, INC., San Francisco, CA (US)

(72) Inventors: Terik Weekes, San Francisco, CA (US);
Sean Belardo, San Francisco, CA (US);
Clint Cope, San Francisco, CA (US);
Colin Owen, San Francisco, CA (US);
Isaiah Jones, San Francisco, CA (US);
Shane Hills, San Francisco, CA (US);
David Merrill, San Francisco, CA (US)

(73) Assignee: ELROY AIR, INC., San Francisco, CA (US)

( * ) Notice: Subject to any disclaimer, the term of this patent is extended or adjusted under 35 U.S.C. 154(b) by 0 days.

(21) Appl. No.: 16/845,939

(22) Filed: Apr. 10, 2020

(65) Prior Publication Data
US 2020/0324934 A1  Oct. 15, 2020

Related U.S. Application Data

(60) Provisional application No. 62/832,710, filed on Apr. 11, 2019.

(51) Int. Cl.
*B64D 9/00* (2006.01)
*B65D 6/34* (2006.01)
*B65D 6/00* (2006.01)

(52) U.S. Cl.
CPC ............... *B65D 7/44* (2013.01); *B64D 9/00* (2013.01); *B65D 11/20* (2013.01)

(58) Field of Classification Search
CPC ........ B65D 65/44; B65D 57/00; B65D 81/05; B65D 81/127; B65D 19/0002; B65D 2571/00037; B65D 2581/053

(Continued)

(56) References Cited

U.S. PATENT DOCUMENTS 3,028,130 A * 4/1962 Burton .................... B64D 9/00
                                                                  244/137.1
5,820,075 A * 10/1998 Speakes ................... B64C 1/20
                                                                  244/118.2

(Continued)

FOREIGN PATENT DOCUMENTS

DE    202014004877 U1   7/2014
EP        2604519 A1    6/2013
GB         777593 A     6/1957

OTHER PUBLICATIONS

International Application No. PCT/US2020/027846, "International Search Report and Written Opinion," International Searching Authority, European Patent Office, dated Sep. 23, 2020.

(Continued)

*Primary Examiner* — D Glenn Dayoan
*Assistant Examiner* — Sunsurraye Westbrook
(74) *Attorney, Agent, or Firm* — Martensen IP; Michael C. Martensen

(57) ABSTRACT

A modular aerial cargo aerodynamic encasement and a method for modular aviation cargo transport is provided. The aviation cargo aerodynamic encasement comprises a platform having a planar upper surface configured to accept cargo and a lower surface. The lower surface includes two or more ground supports displacing a portion of the platform from contact with a supporting surface. The platform includes two or more load transfer structures. The aviation cargo aerodynamic encasement further comprises a fairing configured to detachably couple to the platform, wherein the fairing, when coupled to the platform, forms an aerodynamic encasement, and wherein the aerodynamic encasement is detachably mountable to an aircraft by the two or more load transfer structures.

22 Claims, 23 Drawing Sheets

(58) Field of Classification Search
USPC ....... 410/154, 155, 121, 123, 128, 151, 156, 410/98, 87, 71; 428/116, 12, 118, 119, 428/100, 101, 153, 57, 223, 181
See application file for complete search history.

(56) References Cited

U.S. PATENT DOCUMENTS

| | | | |
|---|---|---|---|
| 5,961,071 | A | 10/1999 | Proctor |
| 6,293,491 | B1 | 9/2001 | Wobben |
| 8,128,026 | B2 | 3/2012 | Shelton |
| 8,393,564 | B2 | 3/2013 | Kroo |
| 8,579,234 | B2 * | 11/2013 | Thompson ............... B64D 1/18 244/136 |
| 8,960,468 | B2 * | 2/2015 | Boivin .................. B65D 19/42 220/4.28 |
| 8,991,751 | B2 | 3/2015 | Page |
| 9,550,567 | B1 | 1/2017 | Erdozain |
| 10,040,553 | B2 | 8/2018 | Frolov |
| 10,059,442 | B2 | 8/2018 | Olm |
| 2009/0014583 | A1 * | 1/2009 | Shelton ................... B64D 9/00 244/118.2 |
| 2013/0020429 | A1 | 1/2013 | Kroo |
| 2014/0048653 | A1 | 2/2014 | Thompson |
| 2015/0136897 | A1 | 5/2015 | Seibel |
| 2016/0207625 | A1 | 7/2016 | Judas |
| 2016/0229534 | A1 | 8/2016 | Hutson |
| 2016/0236774 | A1 | 8/2016 | Niedzballa |
| 2017/0203842 | A1 | 7/2017 | Viaud et al. |
| 2017/0267347 | A1 | 9/2017 | Rinaldi |
| 2017/0300065 | A1 | 10/2017 | Douglas |
| 2017/0300067 | A1 | 10/2017 | Douglas |
| 2017/0313421 | A1 | 11/2017 | Gill |
| 2018/0305005 | A1 | 10/2018 | Parks |

OTHER PUBLICATIONS

Patent Cooperation Treaty Application No. PCT/US2018/057837, "International Search Report and the Written Opinion of the International Searching Authority", Applicant Elroy Air, Inc., dated Jan. 25, 2019.
Patent Cooperation Treaty Application No. PCT/US2018/057837, "International Preliminary Report on Patentability" Applicant Elroy Air, Inc., dated Apr. 28, 2020.
Patent Cooperation Treaty Application No. PCT/US2018/067020, "International Search Report and the Written Opinion of the International Searching Authority", Applicant Elroy Air, Inc., dated Mar. 18, 2019.
Patent Cooperation Treaty Application No. PCT/US2018/067020, "International Preliminary Report on Patentability" Applicant Elroy Air, Inc., dated Jun. 23, 2020.

* cited by examiner

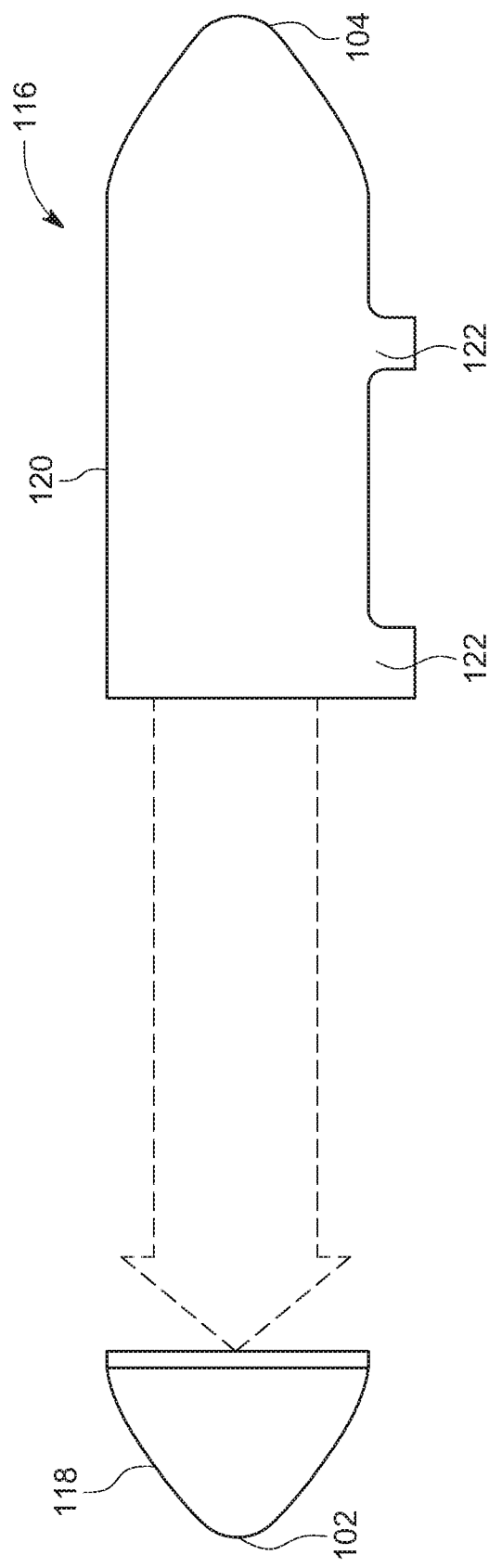
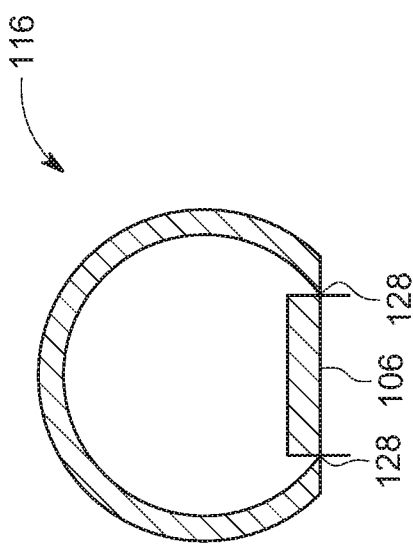
FIG. 3
FIG. 4

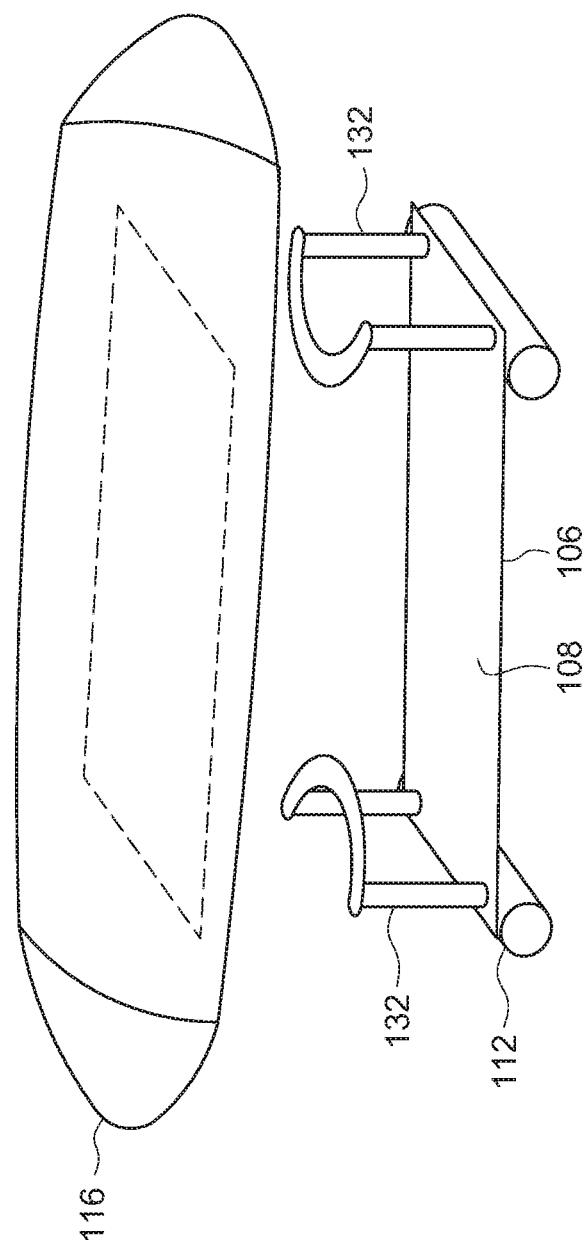

MODULAR AERIAL CARGO AERODYNAMIC ENCASEMENT

CROSS-REFERENCE TO RELATED APPLICATIONS

The present application relates to and claims benefit of priority from U.S. Provisional Application No. 62/832,710 filed 11 Apr. 2019 titled "Aerial Cargo Container" which is hereby incorporated by reference in its entirety for all purposes as if fully set forth herein.

FIELD OF THE PRESENT DISCLOSURE

The present disclosure relates generally to design of shipping containers, and more specifically, to aviation cargo containers for autonomous retrieval and delivery of cargo using aerial vehicles.

BACKGROUND

Cargo comes in all shapes and sizes and with differing degrees of delivery priority. Low-priority cargo is predominantly shipped using container ships for the longest hauls and to a lesser extent using trucks and trains. The "modality" of cargo transport refers to the type of vehicle or vessel involved in the conveyance, for example ship, rail, or truck. "Intermodal" containers that are loaded from one transport vehicle type to another are used for batch movement of shipped articles. An intermodal container is typically a standardized shipping container, designed and built for freight transport, meaning these containers can be used across different modes of transport without unloading and reloading their cargo. Intermodal containers are primarily used to store and transport materials and products efficiently and securely in the global containerized intermodal freight transport system, but smaller numbers and smaller sizes of intermodal containers are in regional use as well. The use of such a container allows for standardized loading and unloading equipment, efficient stacking, and the realization of many other cost savings.

Standard sizes and intermodal nature of these containers have greatly facilitated and lowered the cost of lower priority cargo. Through these technological innovations, cargo has fewer opportunities for theft, touchpoints of personnel and necessary inspection points. And while ships and trains are the normal means of low priority transportation, air cargo has been slow to adopt an intermodal approach to cargo transportation due to a scaling disparity between aircraft capability, weight, and enclosed volume. Accordingly, cost savings from the use of intermodal containers have not been realized in aircraft transportation and the cost of air cargo transport remains high in comparison to other modalities.

New business strategies in logistics (e.g., just-in-time delivery) and globalization of markets have created a strong demand for faster shipping, which cannot be met by traditional freight modes. Ships, trains, and/or trucks are too slow for contemporary demand, yet infrastructure, manpower and fuel costs of traditional aviation inhibit low cost air operations. Air freight needs an intermodal solution capable of interoperating with an aircraft and a traditional warehouse logistics environment.

One solution for aerial transportation of cargo is to use smaller shipping containers called "Unit Load Devices." A unit load device ("ULD") is a pallet or container used to load luggage, freight, and mail on wide-body aircraft and specific narrow-body aircraft. It allows a large quantity of cargo to be bundled into a single unit. Since this leads to fewer units to load, it saves ground crews time and effort and helps prevent delayed flights. Each ULD has its own packing list (or manifest) so that its contents can be tracked. Unfortunately, ULD's are typically aircraft design dependent. A ULD suitable for a Boeing 747 may not be compatible with an Airbus 380.

The existence of exterior cargo containers or pods for aircraft is well known but rarely, outside military applications, utilized. In almost all instances these cargo pods are designed to enhance the internal cargo capability of a specific aircraft. While functional, these types of containers must be carefully fitted and secured to the aircraft and are semi-permanent in nature. Lacking in both the ULD and exterior cargo container models for air cargo transport, however, is the regional transportation and delivery of cargo to a final destination or the ability to quickly mount, dismount, load or unload. Major airports are largely designed for passenger transportation. Even in instances in which cargo aircraft and passenger aircraft coexist, the facilities are not optimized for the retrieval and delivery of cargo. Moreover, once air cargo arrives, especially when a ULD is used, the cargo must be unpacked and then repacked into vehicles for local or regional transportation. By comparison, a shipborne intermodal container can and is efficiently removed from a ship and secured immediately on a vehicle or a train for further regional transportation. These inefficiencies drive up cost and remain a challenge.

Utilization of UAVs to deliver cargo locally has gained wide interest recently. Conceptually, the versatility and autonomy of UAVs make them a logical system for local cargo delivery. Challenges remain, however before this vision becomes a reality. Most small UAVs have limited range and limited lift ability. While small articles can be carried in small conventional containers (boxes) over short distances current UAV cargo delivery systems are not yet economically feasible on a large scale nor as a system by which to deliver and retrieve cargo over longer distances. New and larger UAVs/drones continue to be developed but lacking is a standardized intermediate intermodal cargo container optimized for air transport and utilization with such UAVs.

What is needed therefore is a new kind of shipping container optimized for air transport and capable of being transported by UAVs that can also integrate with a warehouse environment. These new aerial cargo containers must smoothly integrate with the world shipping system that is based on intermodal containers (pallets, jacks, pallet jacks, forklifts) and must also easily accept/deliver cargo and couple and decouple with UAVs to enable a quick and reliable UAV cargo delivery system. These and other deficiencies of the prior art are resolved by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY

In one aspect, an aviation cargo aerodynamic encasement is disclosed. The aviation cargo aerodynamic encasement comprises a platform having a planar upper surface configured to accept cargo and a lower surface. The lower surface includes two or more ground supports displacing a portion of the platform from contact with a supporting surface. The platform includes two or more load transfer structures. The aviation cargo aerodynamic encasement further comprises a fairing configured to detachably couple to the platform, wherein the fairing, when coupled to the platform, forms an aerodynamic encasement, and wherein the aerodynamic encasement is detachably mountable to an aircraft by the two or more load transfer structures.

In one embodiment, the ground supports are configured to displace the lower surface of the platform away from the supporting surface sufficient to accept a lifting mechanism.

In one or more embodiments, the planar upper surface includes a plurality of tie down fixtures.

In one or more embodiments, the two or more ground supports are aerodynamically shaped.

In one or more embodiments, the two or more load transfer structures include a guide configured to accept a grasping mechanism.

In one or more embodiments, the grasping mechanism is configured to raise the aerodynamic encasement to the aircraft whereby the aerodynamic encasement is mounted to the aircraft.

In one or more embodiments, the platform includes a honeycomb structure.

In one or more embodiments, the platform includes a corrugated structure.

In one or more embodiments, the platform is constructed from aerospace material selected from a group consisting of aluminum, titanium, carbon fiber, and composite material.

In one or more embodiments, the fairing includes a front portion and a rear portion that join to encase the platform.

In one or more embodiments, the front portion and the rear portion are coupled to each other and to the platform.

In one or more embodiments, the lower surface of the platform forms an exterior surface of the aerodynamic encasement.

In one or more embodiments, the fairing is configured to withstand aerodynamic forces exerted on the aerodynamic encasement up to 300 mph.

In one or more embodiments, the fairing is a singular component configured to cover the platform.

In one or more embodiments, the fairing includes a detachable side panel configured to laterally accept the platform to form the aerodynamic encasement.

In another aspect, a method for modular aviation cargo transport is disclosed. The method comprises loading a platform with cargo, the platform having a planar upper surface configured to accept the cargo and a lower surface wherein the lower surface includes two or more ground supports displacing a portion of the platform from contact with a supporting surface and wherein the platform includes two or more load transfer structures. The method further comprises encasing the platform with a fairing, the fairing configured to detachably couple to the platform wherein the fairing, when coupled to the platform, forms an aerodynamic encasement. The method further comprises detachably mounting the aerodynamic encasement to an aircraft by the two or more load transfer structures.

In one or more embodiments, the method further comprises displacing, by the ground supports, the lower surface of the platform away the supporting surface sufficient to accept a lifting mechanism.

In one or more embodiments, the method further comprises accepting, by the two or more load transfer structures, a grasping mechanism wherein the grasping mechanism is configured to raise the aerodynamic encasement to the aircraft.

In one or more embodiments, the method further comprises mounting the aerodynamic encasement to the aircraft.

In one or more embodiments, the fairing includes a front portion and a rear portion and further comprising joining the front portion to the rear portion to encase the platform.

In one or more embodiments, responsive to joining the front portion and the rear portion, the method further comprises coupling the fairing to the platform.

In one or more embodiments, the lower surface of the platform forms an exterior surface of the aerodynamic encasement.

In one or more embodiments, the fairing is a singular component configured to cover the platform.

In one or more embodiments, the method further comprises detaching a detachable side panel from the fairing.

In one or more embodiments, the method further comprises laterally accepting the platform into the fairing and reattaching the detachable side panel to form the aerodynamic encasement.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

For a more complete understanding of example embodiments of the present disclosure, reference is now made to the following descriptions taken in connection with the accompanying drawings in which:

FIG. 3 illustrates a diagrammatic side view of a fairing of the aerodynamic encasement of FIG. 1, in accordance with one or more embodiments of the present disclosure;

FIG. 4 illustrates a diagrammatic cross-section view of the fairing of FIG. 3;

FIG. 8 illustrates a diagrammatic exploded view of the aerodynamic encasement showing relative arrangement of the platform and the fairing thereof, in accordance with one or more embodiments of the present disclosure;

Figure 1A:
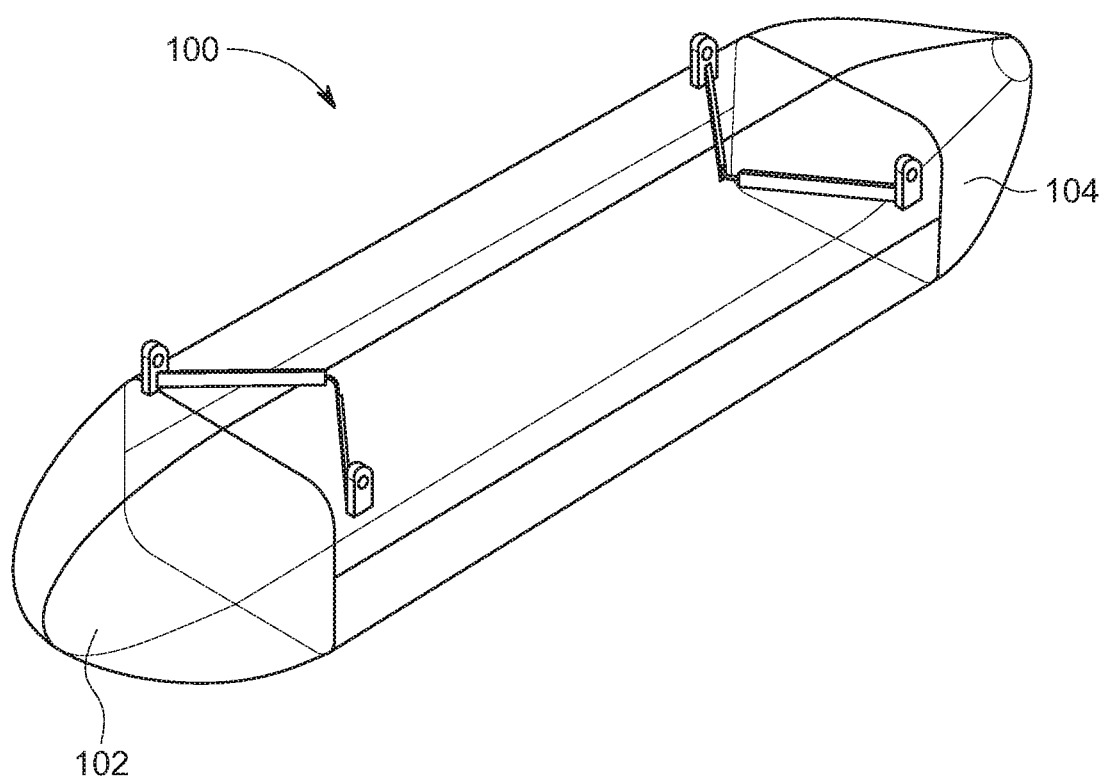
FIGS. 1A-1D illustrate diagrammatic views of an aviation cargo aerodynamic encasement, in accordance with an example embodiment of the present disclosure.
Figure 1B:
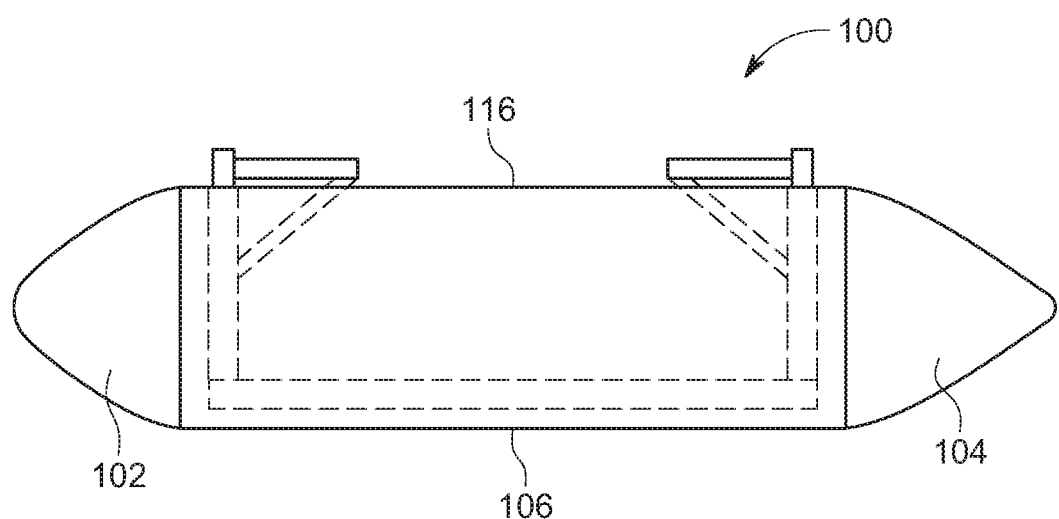
Figure 1C:
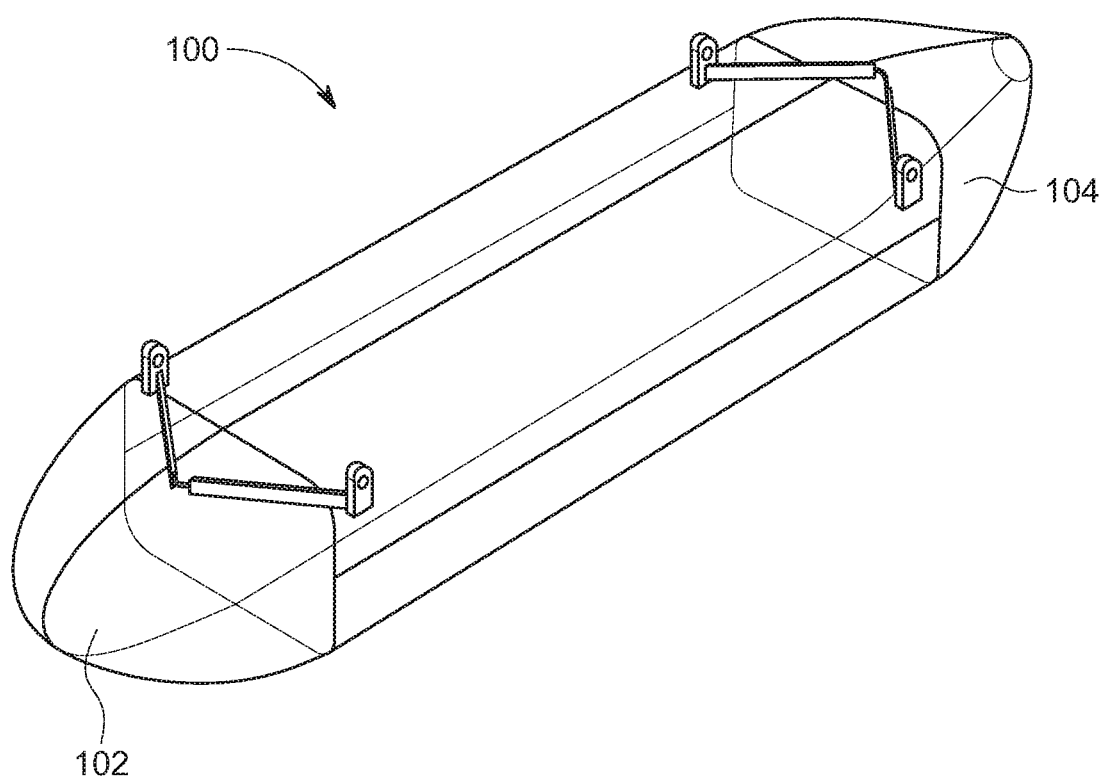
Figure 1D:
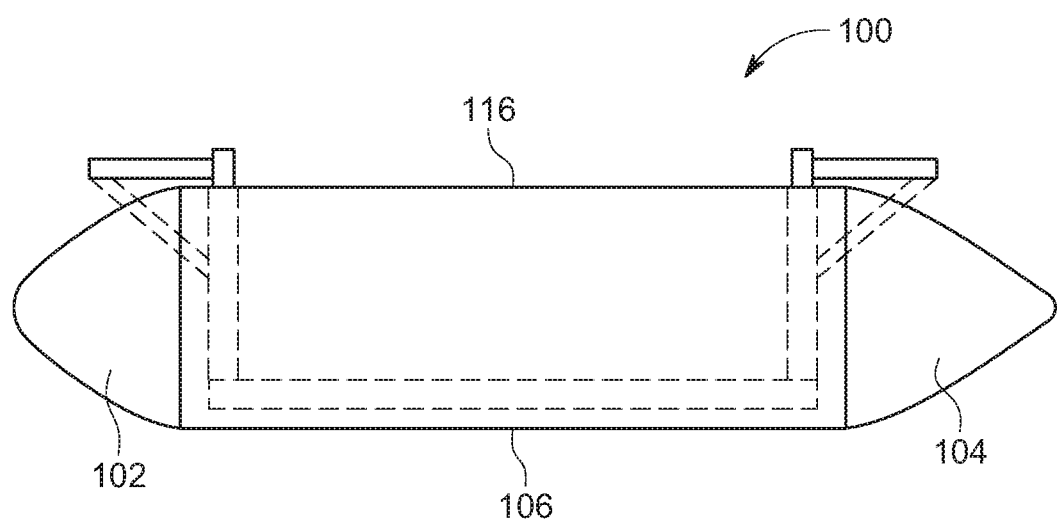

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

An aviation cargo aerodynamic encasement and a method for modular aviation cargo transport are hereafter described by way of example. The aviation cargo aerodynamic encasement of the present invention comprises a platform having a planar upper surface configured to accept cargo and a lower surface. The lower surface includes two or more ground supports displacing a portion of the platform from contact with a supporting surface. The platform further includes two or more load transfer structures. A fairing is configured to detachably couple to the platform, wherein the fairing, when coupled to the platform, forms an aerodynamic encasement. The newly formed aerodynamic encasement is thereafter detachably mountable to an aircraft by the two or more load transfer structures.

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, a reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of reasonable skill in the relevant art that references to a structure or a feature that is "adjacent" to another feature may have portions that overlap or underlie that feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Included in the description are flowcharts depicting examples of the methodology which may be used in conjunction with an aerial cargo aerodynamic encasement as well as load and reposition the cargo aerodynamic encasement relative to a vehicle. In the following description, it will be understood that each block of the flowchart illustrations, and combinations of blocks in the flowchart illustrations, can be implemented by computer program instructions in combination with physical components. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware and/or computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for autonomous retrieval and delivery of cargo aerodynamic encasements through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of the invention.

According to embodiments of the present invention, an aviation cargo aerodynamic encasement (hereinafter, sometimes referred simply to as "aerodynamic encasement") suitable for long distance aerial transport, including by unmanned aerial vehicles (UAVs), is hereafter disclosed by way of example. The aviation cargo aerodynamic encasement of the present invention is the aerial counterpart to intermodal shipping aerodynamic encasements. The morphology, material composition, and attachment points are of necessity unique for the disclosed aerodynamic encasement as is its ability to track its location and communicate to an overall cargo management system. In one example, the present invention provides a substantially rectangular shape aerodynamic encasement optimized for external air transport while nonetheless compatible with intermodal aerodynamic encasements. In one embodiment, the disclosed aerodynamic encasements are stackable to facilitate pre-loading and transportation to and from a port of call while maintaining their ability to integrate with aerial vehicles. Moreover, the aerodynamic encasements are modular in that they comprise a platform that is easily loaded which can then be configured with a fairing encapsulating the platform with an aerodynamic shape suitable for transport mounted to the exterior of an aircraft. The composition of the aerodynamic encasements, platform and fairing, is lightweight yet strong enough to support several hundred pounds of cargo.

Referring to the accompanied drawings, FIGS. 1A-1B illustrate diagrammatic views of an aviation cargo aerodynamic encasement (generally referred by the numeral 100), in accordance with one or more embodiments of the present disclosure. The aerodynamic encasement 100 is generally crafted with a contoured, aerodynamic shape having a nose 102 and tail 104 in order to reduce aerodynamic drag upon the aerodynamic encasement 100 while mounted to an aerial vehicle. In some embodiments, the nose 102 and tail 104 are removable components. Removing these components results in a substantially rectangular shaped aerodynamic encasement 100. Generally, the length, width and depth of the aerodynamic encasement 100 is optimized for use with UAVs and for transport within existing intermodal aerodynamic encasements. In one embodiment, the dimensions of the aerodynamic encasement 100 are optimized for carrying loaded standard pallets.

The construction of the aerodynamic encasement 100 is suited for air operations with low weight and high strength being primary design considerations. In one embodiment, the aerodynamic encasement 100 has a composite construction (e.g. carbon fiber and epoxy). An alternative embodiment may use another process or material to navigate the tradeoffs between weight, strength and cost for the aerodynamic encasement 100. Indeed, there may be multiple types of construction while maintaining the same size and UAV compatibility. For example, a cheaper and less durable (or instead compostable/burnable) version may be used for missions in which it is unlikely the aerodynamic encasement 100 will be reused or in which the useful life of the aerodynamic encasement is of minimal concern (supply of combat troops in the field, for example). Other embodiments may include a more robust, durable construction method to manufacture the aerodynamic encasement 100 that will be used multiple times and thus need to be robust. In one or more embodiments, the aerodynamic encasement 100 can be stacked and loaded into an intermodal aerodynamic encasement whereby physical features of each aerodynamic encasement 100 interlock with other features, allowing the aerodynamic encasements 100 stack vertically on each other.

According to embodiments of the present invention, as may be seen from FIG. 1B, the aerodynamic encasement 100 includes a platform 106. In one version of the present invention the platform 106 forms the floor of the aerodynamic encasement 100. FIG. 2 illustrates a diagrammatic view of the platform 106, in accordance with an embodiment of the present disclosure. The platform 106 is shown to have a generally rectangular shape; however, in other examples, the platform 106 may have any other suitable shape, such as square or the like, without departing from the scope of the present invention. The platform 106 includes an upper surface 108 and a lower surface 110 (the lower surface 110 being generally shown herein). Herein, the upper surface 108 is a planar surface. The upper surface 108 is configured to accept cargo, as discussed later in more detail. In one embodiment of the present invention, the height between the bottom of the ground supports 112 and the bottom of the platform 110 in FIG. 2, is chosen to work with pallet jacks—i.e. high enough so that a pallet jack 114 in its lower position can slip forks under the platform 106, and low enough that the ground supports 112 clear the ground when the pallet jack 114 is in its raised position.

Further, as illustrated, the lower surface 110 includes two or more ground supports 112. In the present illustration, the lower surface 110 has been shown to have four ground supports 112. The ground supports 112 displaces, at least, a portion of the platform from contact with a supporting surface, such as the ground on which the platform 106 is placed. As depicted in FIG. 2, the ground supports 112 are configured to displace the lower surface 110 of the platform 106 away from the supporting surface (i.e. the ground) sufficient to accept a lifting mechanism, such as an exemplary lifting mechanism 114 as shown. It may be appreciated that the lifting mechanism 114 may be a forklift or the like, with the forks thereof being placed accepted under the platform 106 for lifting thereof, as and when required. In the present embodiments, the two or more ground supports 112 are aerodynamically shaped. Such aerodynamic shape of the ground supports 112 helps to reduce aerodynamic drag upon the aerodynamic encasement 100 while mounted to an aerial vehicle (also interchangeably referred to as "aircraft" without any limitations).

Referring back to FIG. 1B, the aerodynamic encasement 100 also includes a fairing 116. FIG. 3 illustrates a diagrammatic view of the fairing 116, in accordance with an embodiment of the present invention. As illustrated in FIG. 3, the fairing 116 has a generally nose-cone shape. Such shape helps to reduce aerodynamic drag upon the aerodynamic encasement 100 while mounted to an aerial vehicle. In particular, the fairing 116, in one embodiment, includes a front portion 118 and a rear portion 120. In the present examples, the front portion 118 may form nose 102 of the aerodynamic encasement 100 and the rear portion 120 may include tail 104 of the aerodynamic encasement 100. The front portion 118 and the rear portion 120 are joined together to complete the fairing 116. When joined, the front portion 118 and the rear portion 120 of the fairing 116 encase the platform 106. Specifically, the front portion 118 and the rear portion 120 of the fairing 116 are coupled to each other and to the platform 106. As illustrated, the fairing 116 may also include legs 122 complementary to the ground supports 112 in the platform 106.

Figure 2:
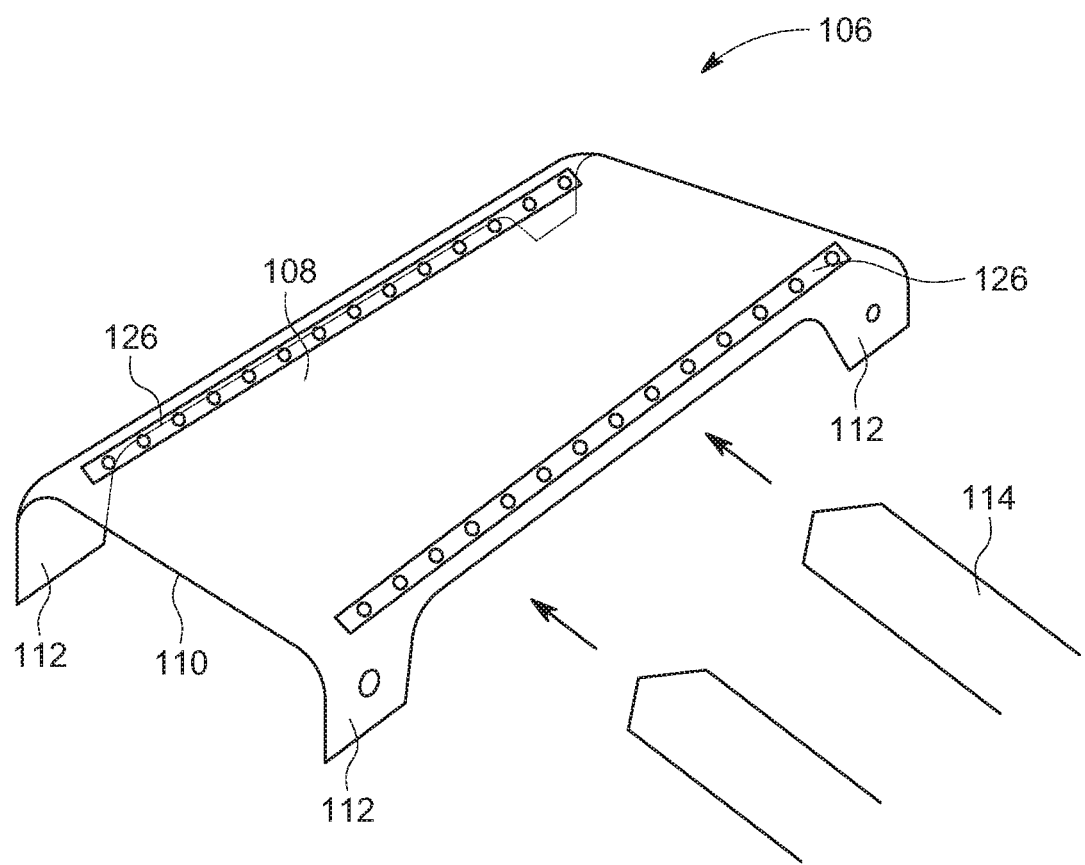
FIG. 2 illustrates a diagrammatic perspective view of a platform of the aerodynamic encasement of FIG. 1, in accordance with one or more embodiments of the present disclosure.

In general, the fairing 116 is configured to detachably couple to the platform 106. As shown in FIG. 4, it may be understood that the fairing 116 may have a generally circular cross-section with a section towards the lower part being cut-off in order to be able to couple to the platform 106. In other embodiments the cross-section may be more rectangular to facilitate intermodal incorporation. For this purpose, as illustrated in FIG. 2, the platform 106 includes channels 126 formed therein. Further, the fairing 116 may include corresponding channels (not shown) at the inside region of edges 128 of the cut-off circular cross-section of the fairing 116. The channels 126 in the platform 106 may engage with the corresponding channels 128 in the fairing 116 to configure the fairing 116 to detachably couple to the platform 106. Other methodology to couple the fairing 116 to the platform 106 to form the aerodynamic encasement are contemplated and will be recognized by one or reasonable skill in the relevant art. The fairing 116, when coupled to the platform 106, forms an aerodynamic encasement. With such a design configuration, it shall be understood that the lower surface 110 of the platform 106 forms an exterior surface of the aerodynamic encasement. In the present embodiment, the aerodynamic encasement 100 is implemented to be mounted to an exterior of an aircraft (as discussed later) as an encased platform. Therefore, the aerodynamic encasement 100 may be subjected to many forces while mounted to an aerial vehicle. In such an embodiment, the fairing 116 is configured to withstand aerodynamic forces exerted on the aerodynamic encasement up to, for example, 300 mph as well as typical accelerations forces encountered during flight operations. Other embodiments may include fairings having higher structural integrity to withstand increased dynamic loading. Further, in another embodiment, the fairing 116 may be a singular component configured to cover the entirety of the platform 106.

Figure 5A:
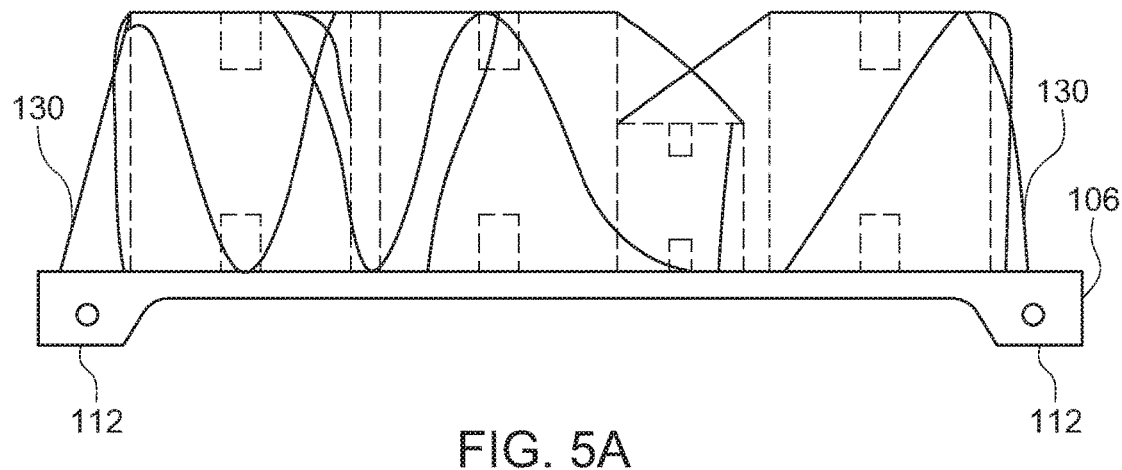
FIGS. 5A-5B illustrate diagrammatic side and top planar views respectively of the platform in loaded configurations, in accordance with one or more embodiments of the present disclosure.
Figure 5B:
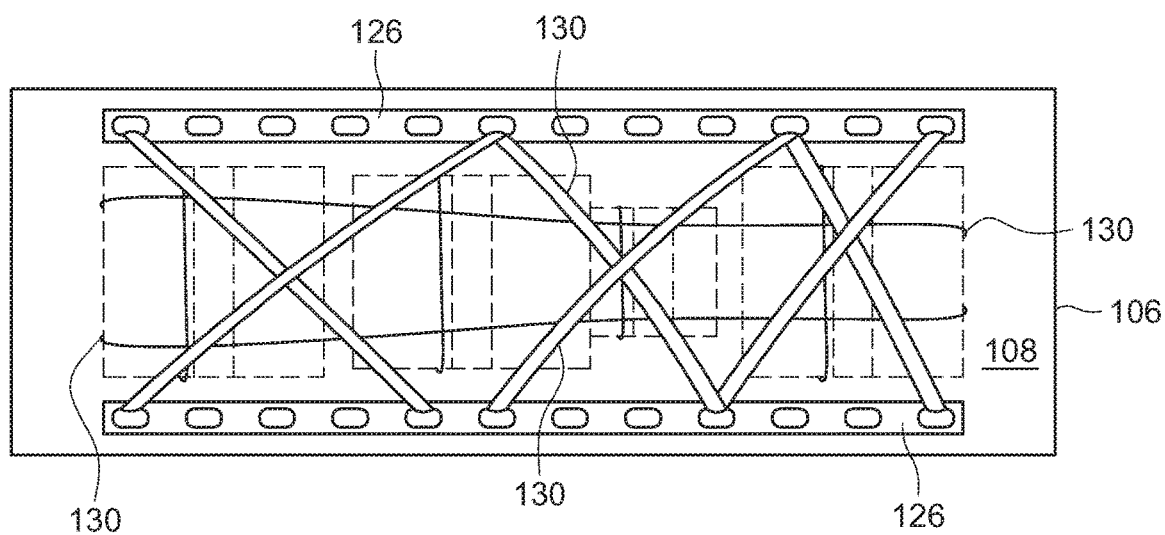
Figure 6A:
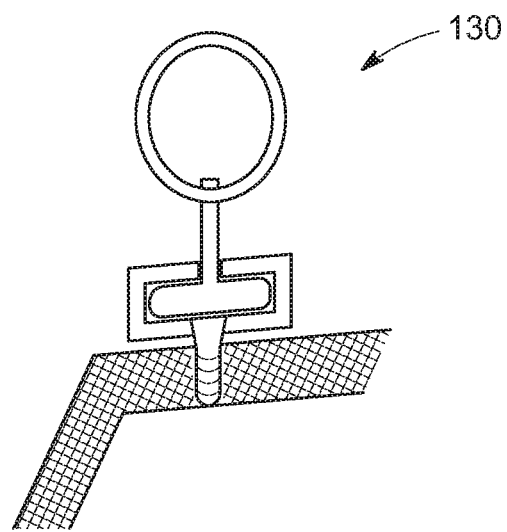
FIGS. 6A-6B illustrate diagrammatic views of tie down fixtures for the platform, in accordance with one or more embodiments of the present disclosure.
Figure 6B:
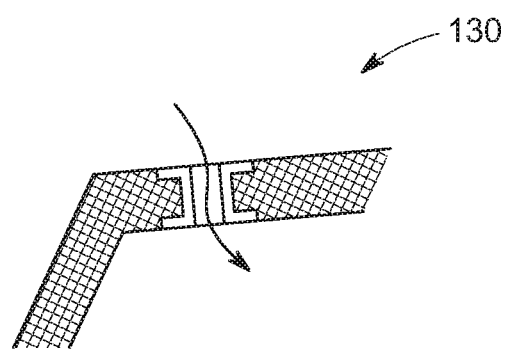

As discussed, in the present embodiments, the upper surface 108 of the platform 106 is configured to accept cargo. For this purpose, as illustrated in FIGS. 5A-5B, the planar upper surface 108 includes a plurality of tie down fixtures 130. The tie down fixture 130 (also known as a tie down strap, a ratchet strap, a lashing strap, fittings) includes a fastener used to hold down cargo or equipment during transport on the platform 106. The tie down fixtures 130 are, in one embodiment, essentially webbing outfitted with tie down hardware attachable to the area surrounding the cargo or equipment, loop over the cargo or equipment, and/or attach to the cargo or equipment. FIGS. 6A and 6B illustrate two exemplary types of tie down fixtures 130 that may be employed for the embodiments of the present disclosure. For example, FIG. 6A provides a tie down fixture 130 with a variety of loop straps, which includes a single piece of webbing that is looped around the item to be protected and the two endpoints are brought together at the tie down fastener for fastening and providing tension. Herein, the tie down provisions (fittings) may be made using L-track. FIG. 6B provides a tie down fixture 130 with pass-through design, as known in the art. Again, as illustrated in FIGS. 5A-5B, the cargo (herein shown in the form of dashed boxes) may be placed over the upper surface 108 of the platform 106, and the tie down fixtures 130 are used to secure and hold down the cargo on the platform 106. The use of tie down fixtures 130 allows to secure different type and sizes of cargos on the platform 106, as required.

In one embodiment, the aerodynamic encasement 100 may include one or more bladders (not shown) that can be inflated to fill empty space. Such inflated bladders can fill areas of the aerodynamic encasement 100 that are not used and/or can be used in lieu of the tie down fixtures 130. In one embodiment, these bladders are positioned on the sides of the aerodynamic encasement 100. The bladders can optionally include a pressure release system to adjust for external pressure changes incurred during flight operations. In other alternative embodiments, the bladders can store fuel for the aerial vehicle or even as a product for transportation. Such fuel-storage bladders can be rigid with baffles and/or can employ open-cell foam to prevent fuel sloshing, as may be contemplated by a person skilled in the art with racing fuel tanks.

In one example, as illustrated, the encasement may also include one or more payload dividers 138 for separating the cargo for uniform loading of the platform 106, as discussed later in more detail. That is, the internal compartments of the aerodynamic encasement 100 may include internal payload dividers 138 that can be repositioned to ensure that loads do not shift and damage cargo, pod, or the aircraft fuselage or affect the center of gravity ("CG") of the aerial vehicle during flight operations. These payload dividers 138, in one embodiment, can be fastened at 3 points and/or can also act as a lateral reinforcement for the aerodynamic encasement 100. The internal payload dividers 138 of the present invention are designed to resist lateral and negative G forces with the bottom structure of the aerodynamic encasement 100 and to withstand positive G-forces experienced during flight and hard landings. The payload dividers 138 are adjustable to accommodate different sizes of cargo. Alternatively, the opening of the aerodynamic encasement 100 can be an open span with one or more removable bars that spans this opening, serving as lateral reinforcement. In another embodiment, cargo can be secured within the aerodynamic encasement 100 by bracing the cargo against a panel which is set into the aerodynamic encasement 100 to function as an internal divider or using a net/webbing. Webbing can be integrated with the internal panel dividers 138. Cargo can also be secured with a sub-sack system having gear loops for tie-down. Gear is secured in the bag, and then the bag is secured to cargo aerodynamic encasement. Sub sacks can be integrated with internal panel dividers 138. In an embodiment, the locations of the tie down fixtures 130 are integrated with each panel divider 138 and on the sidewalls of the aerodynamic encasement 100 to prevent further movement of the cargo.

Figure 7A:
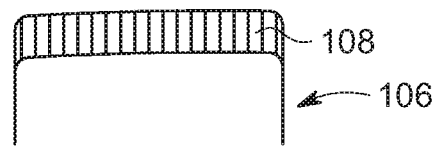
FIGS. 7A-7C illustrate various exemplary design configurations for the platform, in accordance with one or more embodiments of the present disclosure.
Figure 7B:
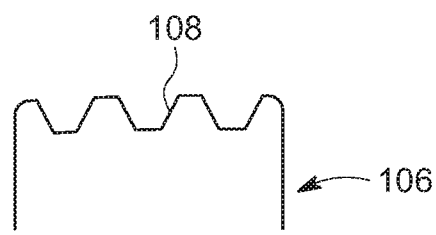
Figure 7C:
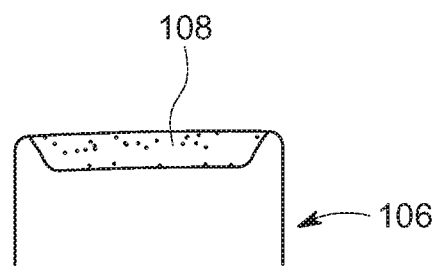

According to embodiments of the present disclosure, the platform 106 may have different structural configurations or designs to support the cargo thereon. In one embodiment, as illustrated in FIG. 7A, the platform 106, or specifically the upper surface 108 of the platform 106, includes a honeycomb structure. In another embodiment, as illustrated in FIG. 7B, the platform 106, or specifically the upper surface 108 of the platform 106, includes a corrugated structure. In yet another embodiment, as illustrated in FIG. 7C, the platform 106, or specifically the upper surface 108 of the platform 106, includes a laminated structure. It may be contemplated that the structural configuration or design choice for the platform 106 may be based on the type of cargo to be supported on the platform 106. Further, in an embodiment, the platform 106 is constructed from aerospace material selected from a group consisting of aluminum, titanium, carbon fiber, and composite material. Such material choice provides strong yet light-weight platform 106 to allow for easy and cost-efficient aerial travel.

Figure 9:
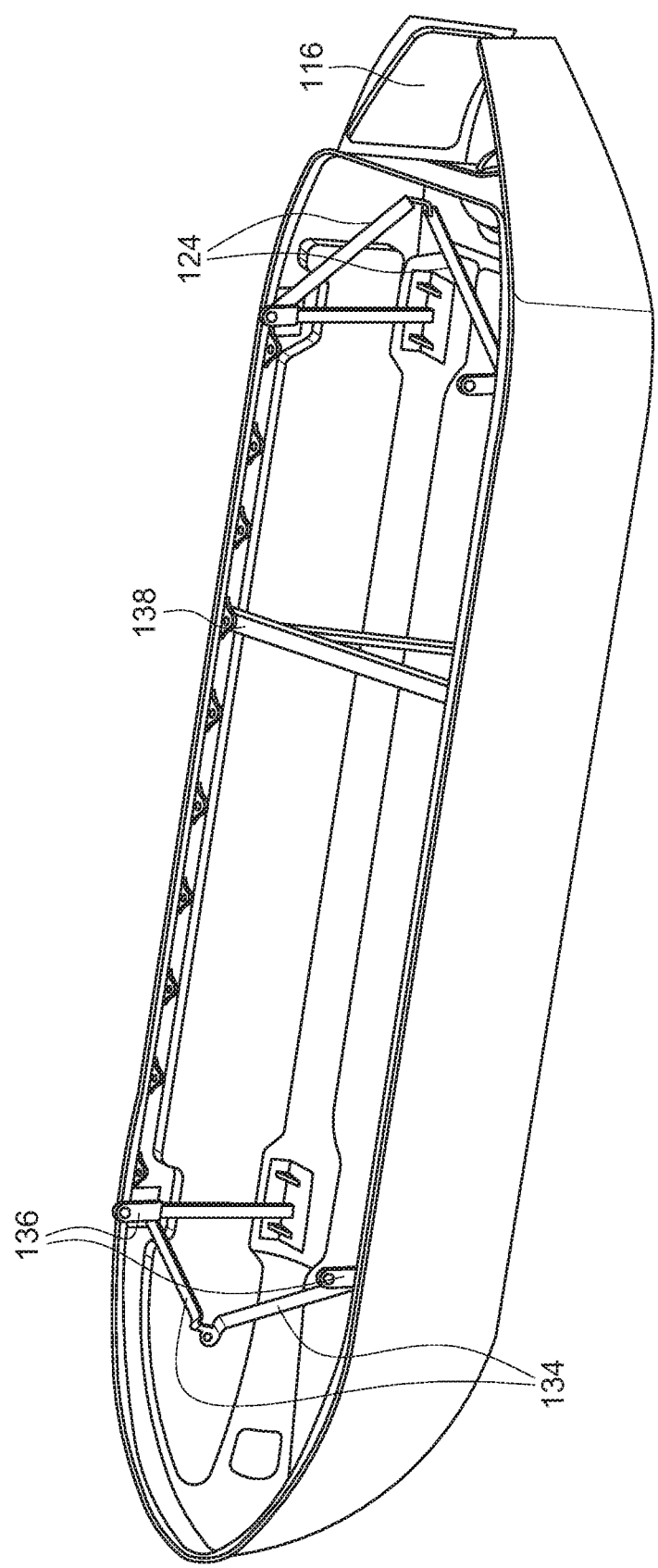
FIG. 9 illustrates a diagrammatic sectioned view of the aerodynamic encasement, in accordance with one or more embodiments of the present disclosure.
Figure 10A:
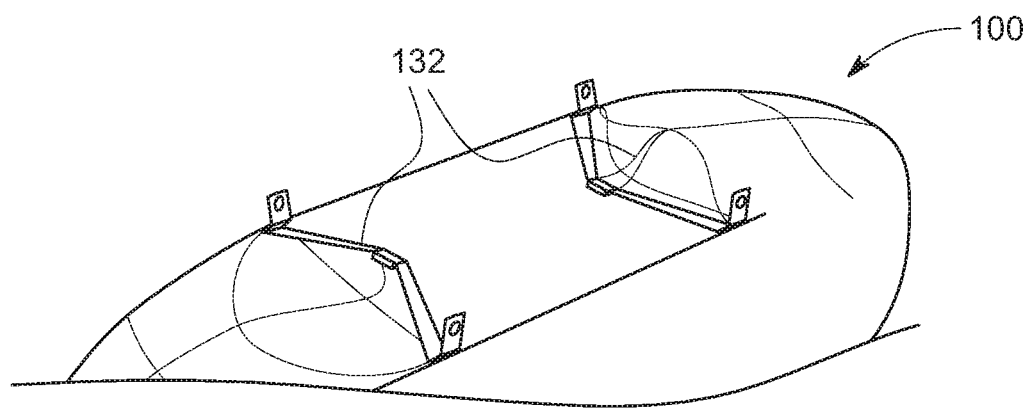
FIGS. 10A-10C illustrate various exemplary design configurations for the aerodynamic encasement with load transfer structures, in accordance with one or more embodiments of the present disclosure.
Figure 10B:
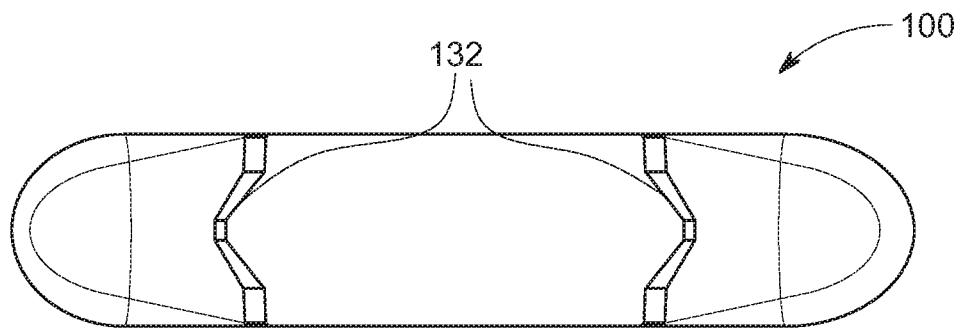
Figure 10C:
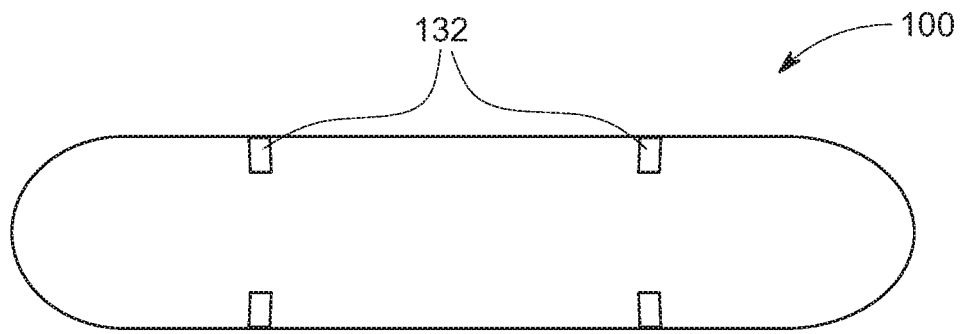

FIG. 8 illustrates an exploded diagrammatic view of the aerodynamic encasement 100 (or specifically the encasement), in accordance with an embodiment of the present invention. As illustrated, the aerodynamic encasement 100 includes the platform 106 and the fairing 116. Herein, the platform 106 includes two or more load transfer structures 132. The load transfer structures 132 may generally be in the form of extensions from the upper surface 108 of the platform 106. FIG. 8 provides an embodiment of aerodynamic encasement 100 with the platform 106 having the load transfer structures 132 with a simple (conceptual) design. FIG. 9A provides a sectioned (or cut-away) view of the aerodynamic encasement 100 with the platform 106 having the load transfer structures 132, in accordance with embodiments of the present invention. As illustrated, the load transfer structures 132 include pairs of guides 124, 134 configured to accept a grasping mechanism (not shown). It shall be understood that the grasping mechanism is configured to raise (or lower) the aerodynamic encasement to the aircraft whereby the aerodynamic encasement is mounted to the aircraft using various latching points 136. In an embodiment, as shown, the guides 124,134 may be in the form of guide bars (as shown). The load transfer structures 132 incorporate the latching points 136 to enable direct load transfer to the aircraft once mounted. FIGS. 10A-10C illustrates different views of the aerodynamic encasement 100 (or the encasement) with alternative load transfer structures 132, in accordance with the embodiments of the present invention.

In a preferred embodiment, the aerodynamic encasement 100 is coupled to the underside of an aerial vehicle's fuselage. In other embodiments, multiple aerodynamic encasements 100 can be mounted under the fuselage and/or at various locations under wing depending on the capability of the aerial vehicle. In still other embodiments, the aerodynamic encasement 100 is capable of being partially or entirely drawn into the fuselage of the aerial vehicle or mounted securely on top of the vehicle. In one embodiment, a compressible gasket along the upper edge of the cargo aerodynamic encasement comprises a seal with the corresponding surface of the aircraft. In one embodiment, a compressible gasket along the upper edge of the aerodynamic encasement 100 includes a seal with the corresponding surface of the aircraft fuselage. In an alternate embodiment, the seal to which the interfaces of the aerodynamic encasement 100 are embedded in the belly of the fuselage. In the case in which the aerodynamic encasement 100 couples to the underside of an aerial vehicle's fuselage, this seal keeps dust, moisture and other particles from entering the aerodynamic encasement during flight operations and prevents the aerodynamic encasement 100 from abrading the fuselage.

Figure 11:
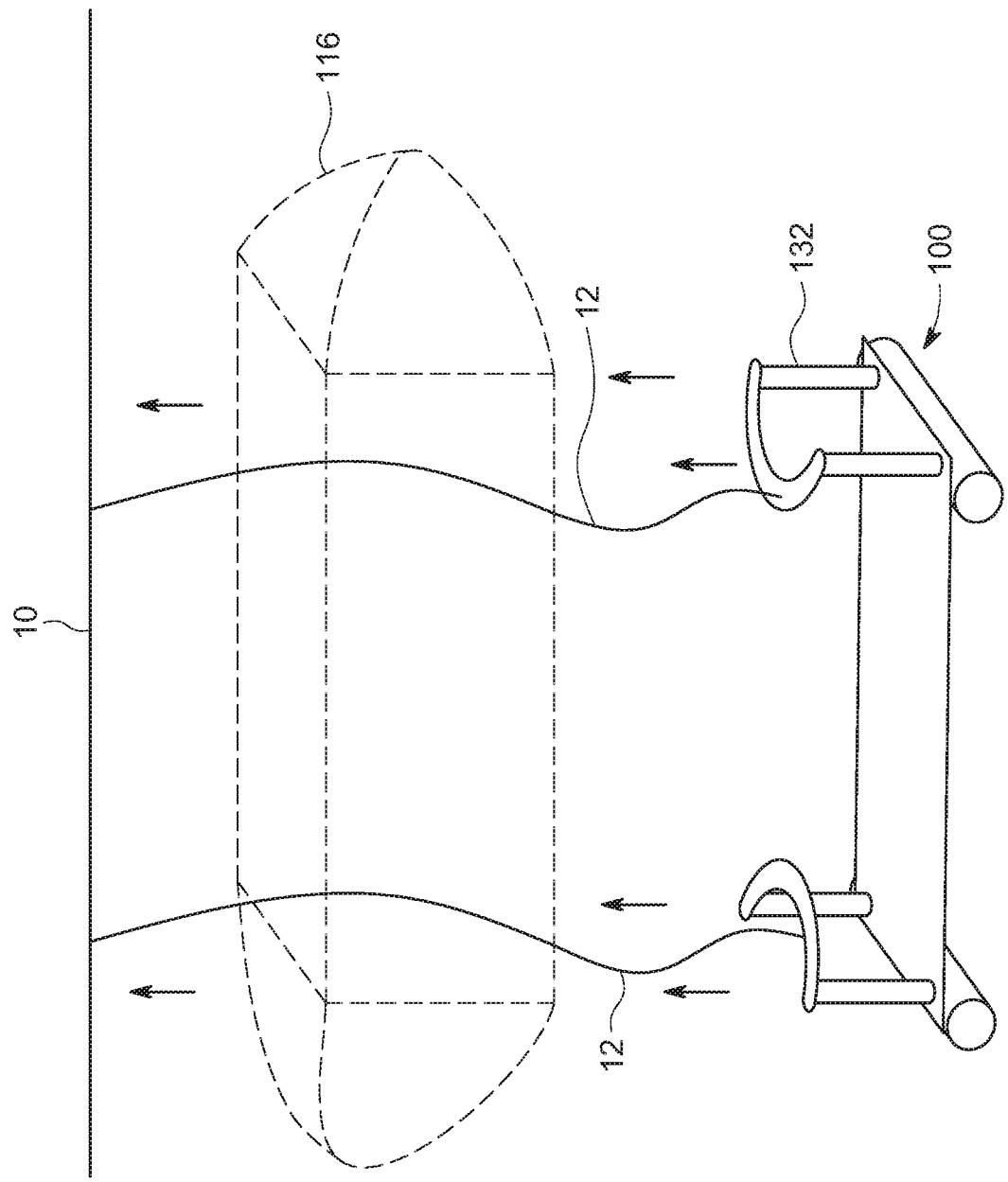
FIG. 11 depicts an exemplary implementation of the aerodynamic encasement being coupled to an aircraft, in accordance with one or more embodiments of the present disclosure.

In the present embodiments, the aerodynamic encasement 100 (or the aerodynamic encasement) is detachably mountable to an aircraft 137 (i.e. an aerial vehicle like UAV) by the two or more load transfer structures 132 in conjunction with a plurality of latching points 136. FIG. 11 depicts an exemplary implementation showing the encasement (herein, only the platform 106 with the load transfer structures 132 is shown for simplicity sake) being mounted to an aircraft 10 (schematically shown). As may be seen, some cords 12 may be hung from the aircraft 10 which may be coupled to the load transfer structures 132 and the aerodynamic encasement 100 is pulled towards the aircraft 10 to be mounted therewith by any suitable coupling mechanism known in the art without any limitations. In another example, the platform 106 may have a winch (not shown) or the like providing cord to be attached to a support structure in the aircraft, such that the encasement may be pulled towards the aircraft for mounting therewith.

A significant feature of the present invention is the modular nature of the aerodynamic encasement 100 and its ability to couple with an aerial vehicle. This coupling is accomplished through a series of steps which progressively align and draw together the aerodynamic encasement 100 to the fuselage. The aerodynamic encasement 100 contains guidance features which join with a grasping mechanism from the aircraft to place the aerodynamic encasement 100 into correct alignment and position for coupling with the aircraft. These guidance features can be removable for stacking and transport. Fundamentally the guidance feature of each aerodynamic encasement 100 guides the grasping mechanism of the UAV into alignment along the longitudinal center axis of the aerodynamic encasement 100. As the grasping mechanism engages the aerodynamic encasement 100, the longitudinal center axis of the aerodynamic encasement 100 becomes parallel to the longitudinal axis of the aircraft. Guidance features for this grasping are mounted in the nose 102 and the tail 104 of each aerodynamic encasement 100. In an alternative embodiment, they are mounted to structural spreader bars located at each end and in the interior of the aerodynamic encasement 100. In some embodiments, the guidance features are standalone assemblies dropped into each aerodynamic encasement 100 with a plurality of fasteners. With locations to catch each fastener present on the sides and ends of the aerodynamic encasement 100, the guidance feature assembly is easily installed.

Figure 12:
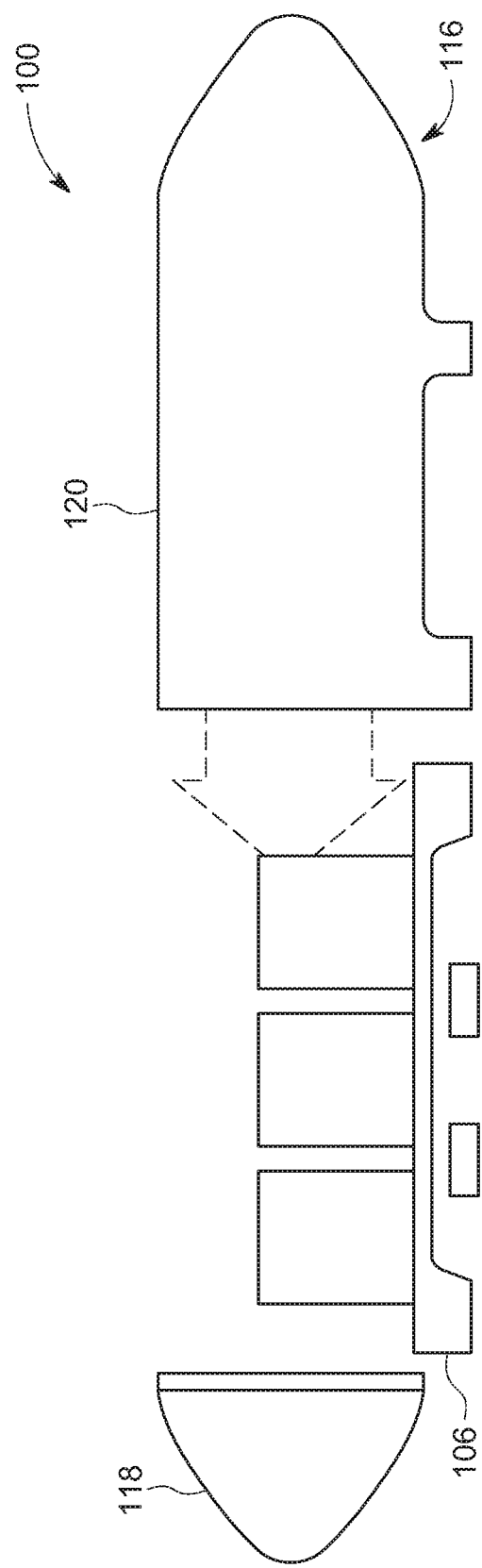
FIG. 12 depicts an exemplary implementation of the aerodynamic encasement being loaded, in accordance with one or more embodiments of the present disclosure.

FIG. 12 depicts a process of loading the cargo in the aerodynamic encasement 100, in accordance with an exemplary embodiment of the present invention. As may be seen, the cargo (herein, shown as boxes) is first loaded onto the platform 106. Then, the front portion 118 and the rear portion 120 of the fairing 116 are moved towards each other, and that the front portion 118 and the rear portion 120 join together to encase the platform 106. It may be appreciated that the front portion 118 and the rear portion 120 may have seals for secure joining of the two portions 118, 120, so as to protect the cargo therein while the aerodynamic encasement 100 is mounted to an aerial vehicle. It may also be appreciated that the platform 106 with the ground supports 112 allows for easy sliding of the two portions 118, 120, along the channels 126, without the need of lifting the platform 106 above the support surface.

Figure 13A:
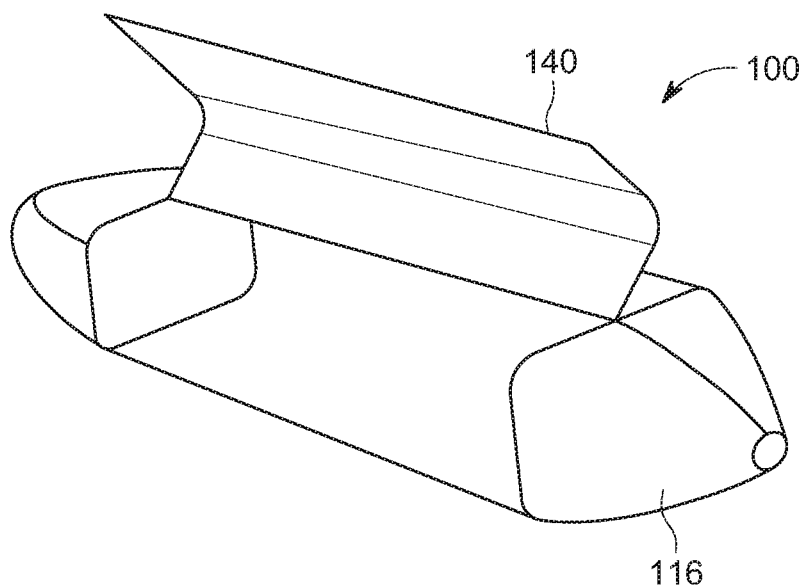
FIG. 13A illustrates a diagrammatic perspective view of the aerodynamic encasement, in accordance with another embodiment of the present disclosure.
Figure 13B:
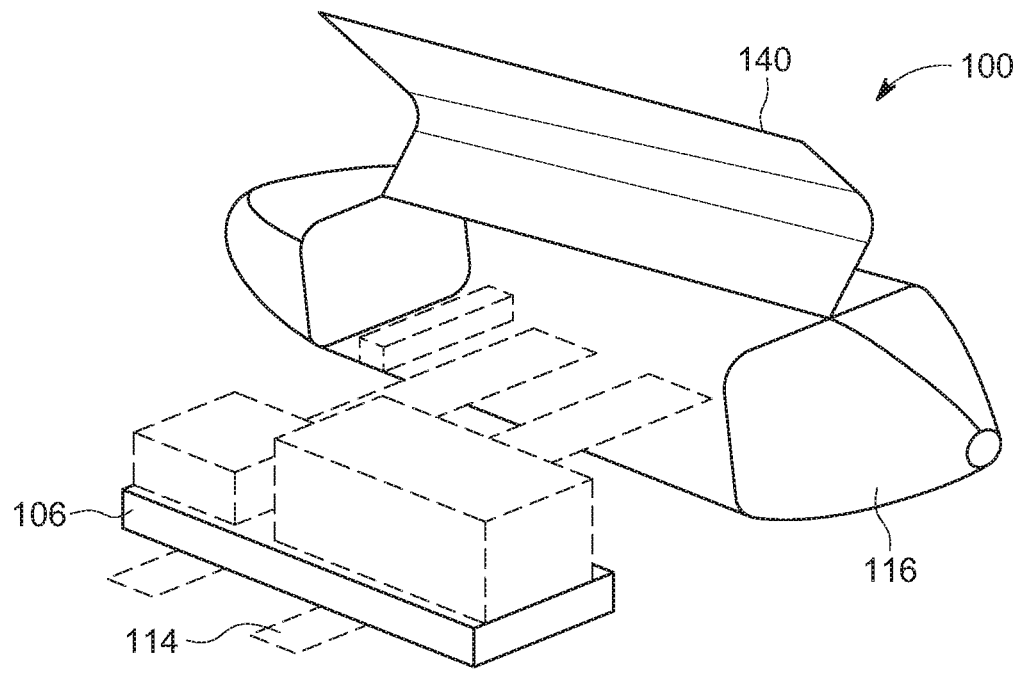
FIG. 13B depicts an exemplary implementation of the aerodynamic encasement of FIG. 13A for loading thereof.

FIGS. 13A-13B illustrate the aviation cargo aerodynamic encasement 100, in accordance with another embodiment of the present disclosure. Herein, the fairing 116 includes a side panel 140 provided on a lateral side of the fairing 116. The side panel 140 is configured to laterally accept the platform 106 to form the aerodynamic encasement. Herein, as may be seen from FIG. 13B, the platform 106 is loaded from the lateral side of the fairing 116 through the side panel 140. In one or more embodiments, the side panel 140 is a detachable side panel. In such case, for loading, the detachable side panel 140 is detached from the fairing 116, the platform 106 is laterally accepted into the fairing 116, and finally the detachable side panel 140 is reattached to form the aerodynamic encasement. In other embodiments, the side panel 140 may be in the form of hinged door or any other suitable configuration to provide access to the inside of the aerodynamic encasement 100 (i.e. encasement) without departing from the scope and the spirit of the present invention. Sensors can, in other embodiments of the present invention, be incorporated to identify whether (and when) the doors and/or components of the fairing are secure. For example should the door come open in flight or when the interior of the aerodynamic encasement 100 was accessed on the ground.

Figure 14A:
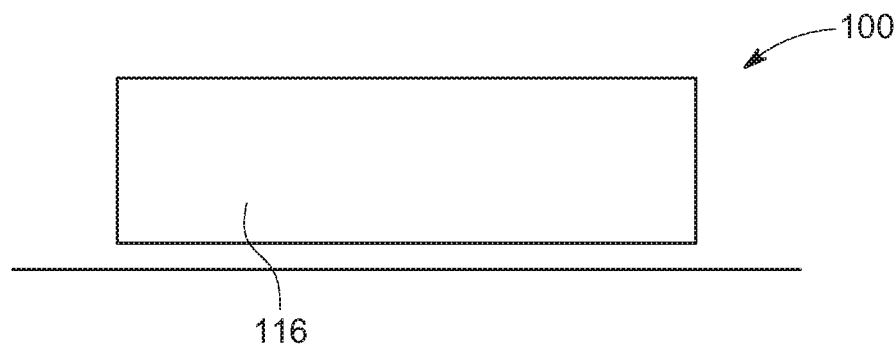
FIG. 14A illustrates a diagrammatic perspective view of the aerodynamic encasement, in accordance with yet another embodiment of the present disclosure.
Figure 14B:
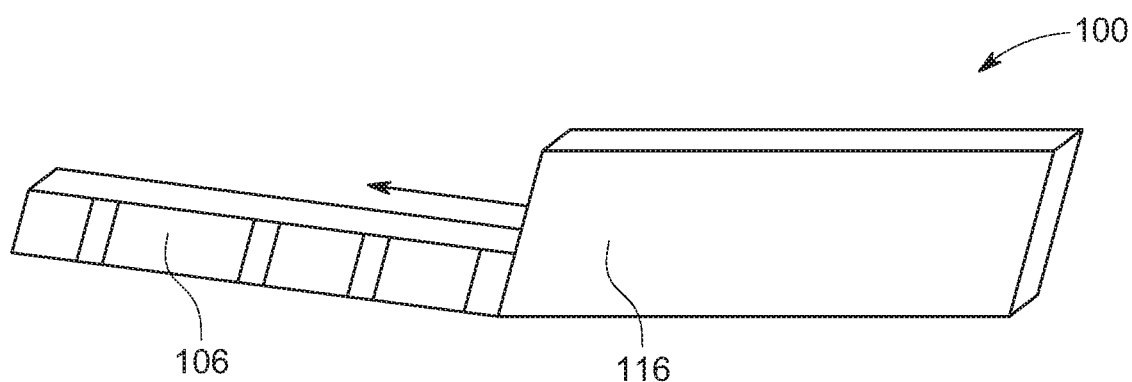
FIG. 14B depicts an exemplary implementation of the aerodynamic encasement of FIG. 14A for loading thereof.
Figure 15A:
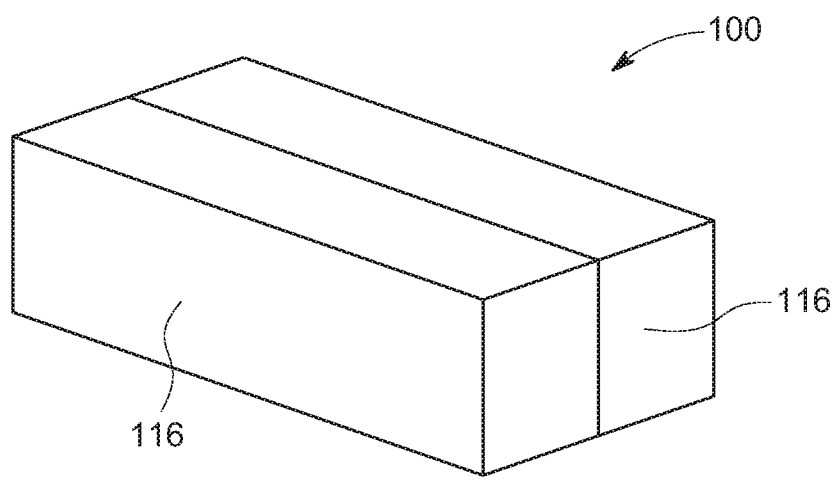
FIG. 15A illustrates a diagrammatic perspective view of the aerodynamic encasement, in accordance with yet another embodiment of the present disclosure.
Figure 15B:
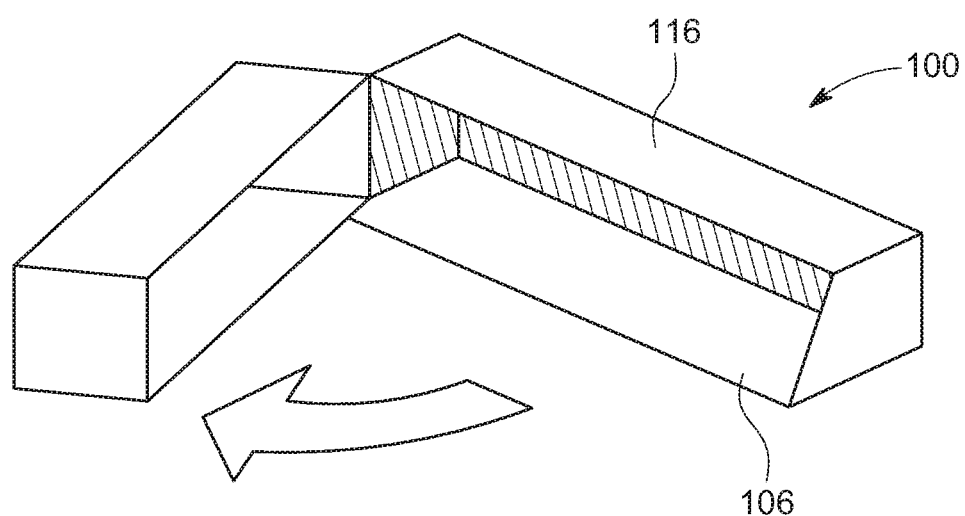
FIG. 15B depicts an exemplary implementation of the aerodynamic encasement of FIG. 15A for loading thereof.
Figure 16A:
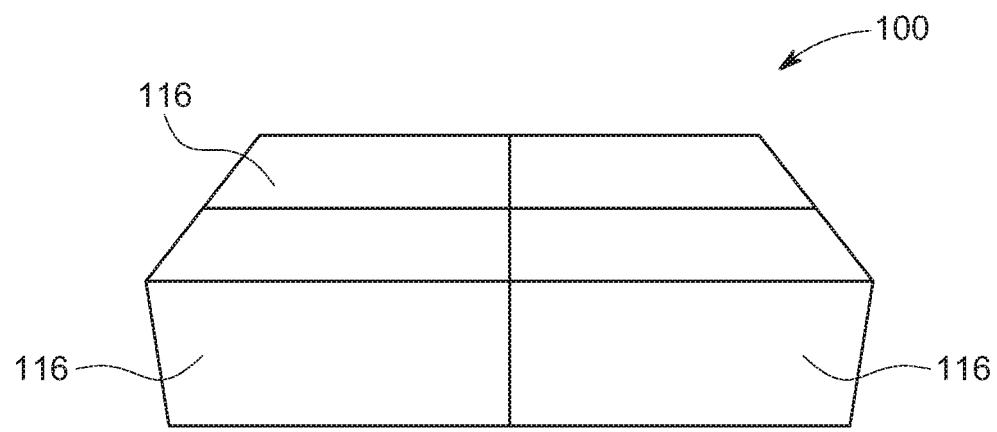
FIG. 16A illustrates a diagrammatic perspective view of the aerodynamic encasement, in accordance with yet another embodiment of the present disclosure.
Figure 16B:
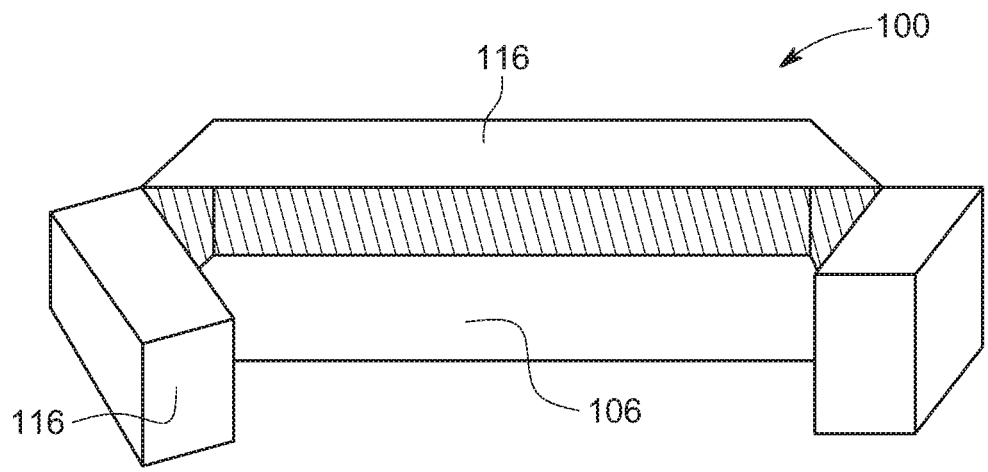
FIG. 16B depicts an exemplary implementation of the aerodynamic encasement of FIG. 16A for loading thereof.
Figure 17A:
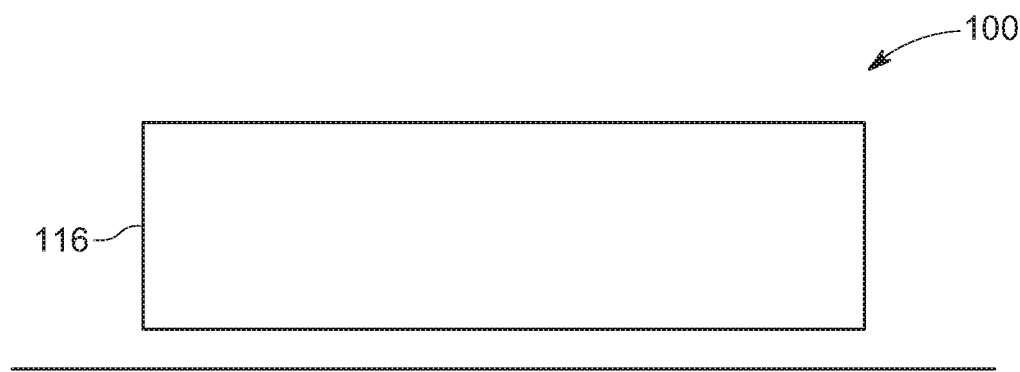
FIG. 17A illustrates a diagrammatic perspective view of the aerodynamic encasement, in accordance with yet another embodiment of the present disclosure.
Figure 17B:
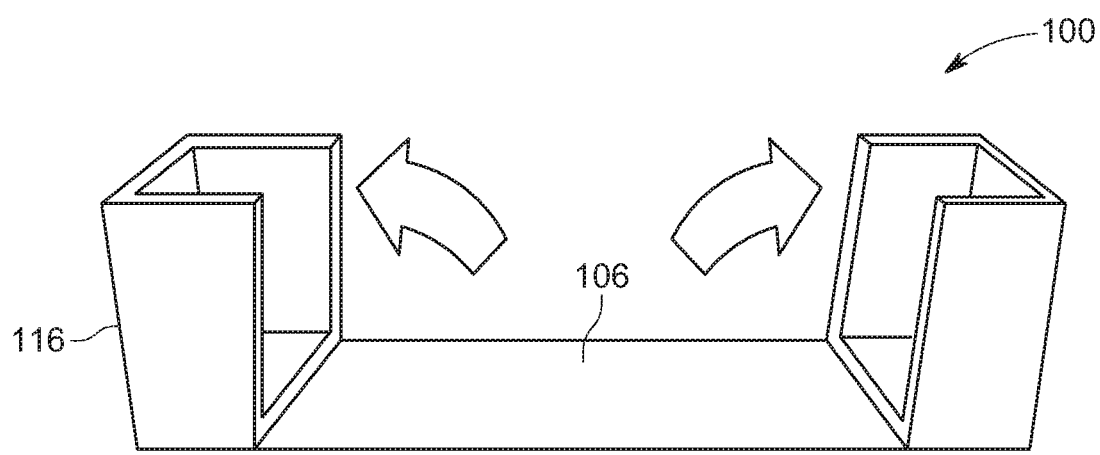
FIG. 17B depicts an exemplary implementation of the aerodynamic encasement of FIG. 17A for loading thereof.
Figure 18A:
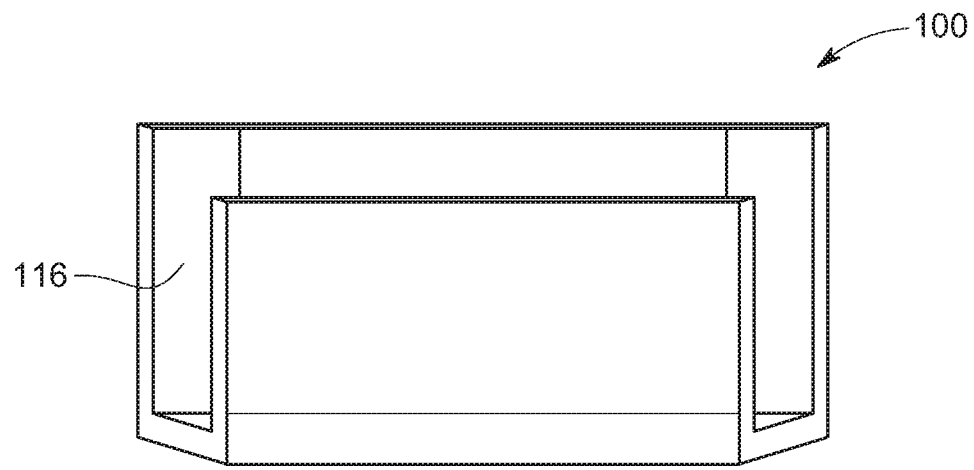
FIG. 18A illustrates a diagrammatic perspective view of the aerodynamic encasement, in accordance with yet another embodiment of the present disclosure.
Figure 18B:
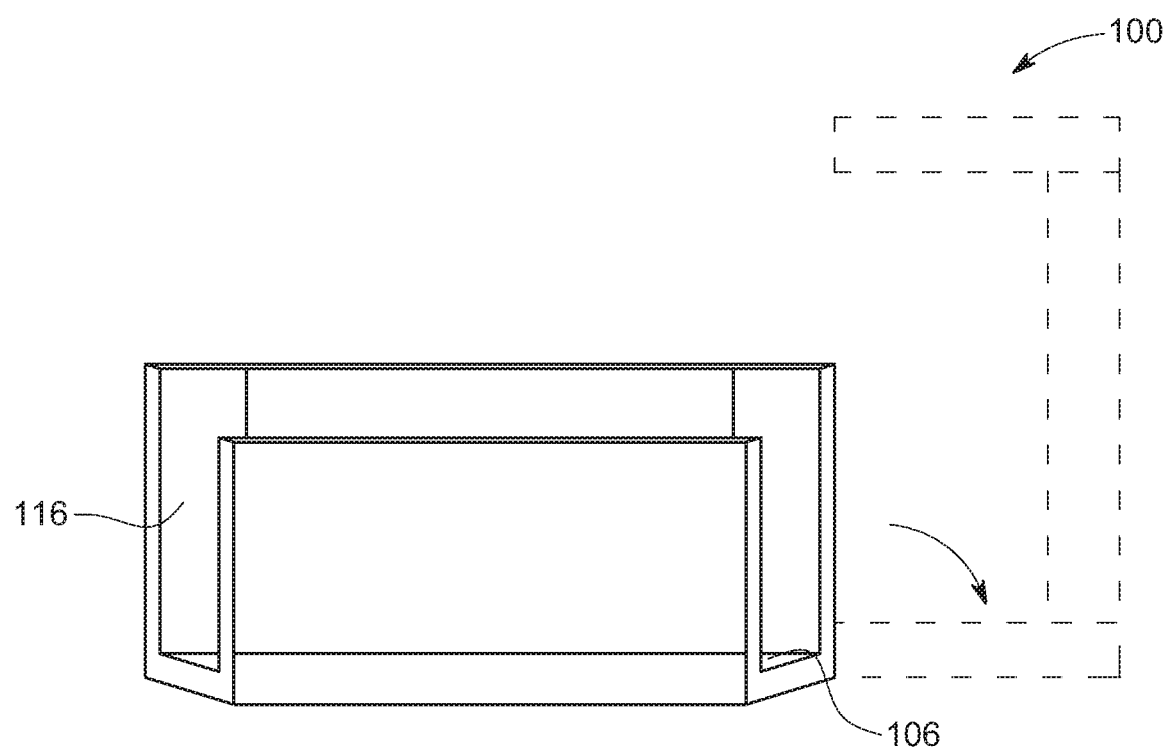
FIG. 18B depicts an exemplary implementation of the aerodynamic encasement of FIG. 18A for loading thereof.
Figure 19A:
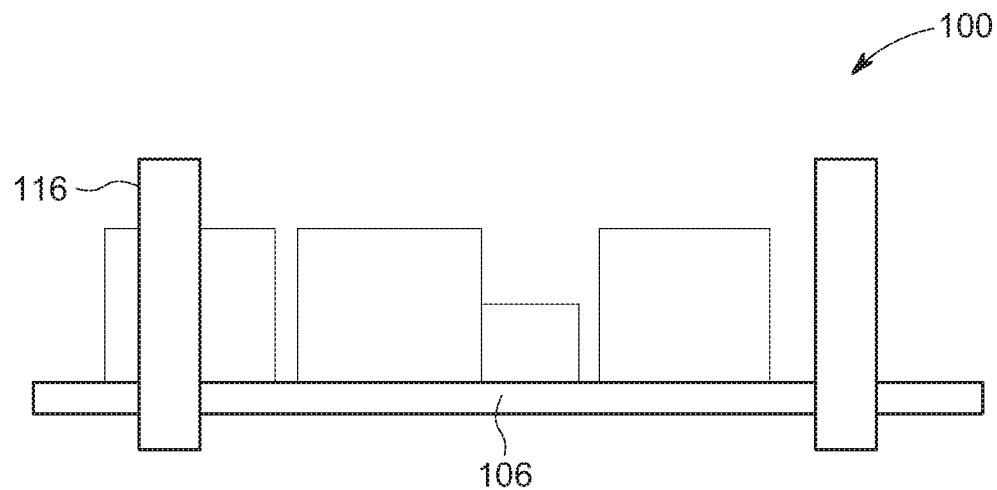
FIG. 19A illustrates a diagrammatic perspective view of the aerodynamic encasement, in accordance with yet another embodiment of the present disclosure.
Figure 19B:
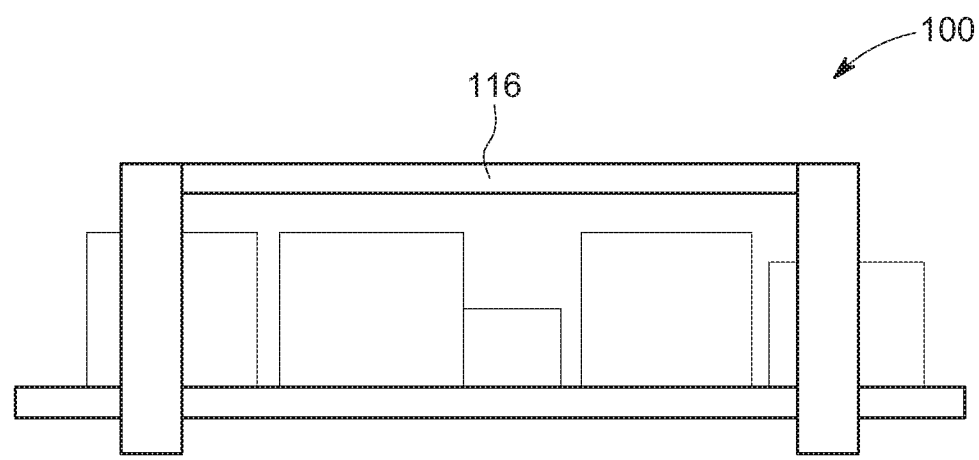
FIG. 19B depicts an exemplary implementation of the aerodynamic encasement of FIG. 19A for loading thereof.
Figure 20A:
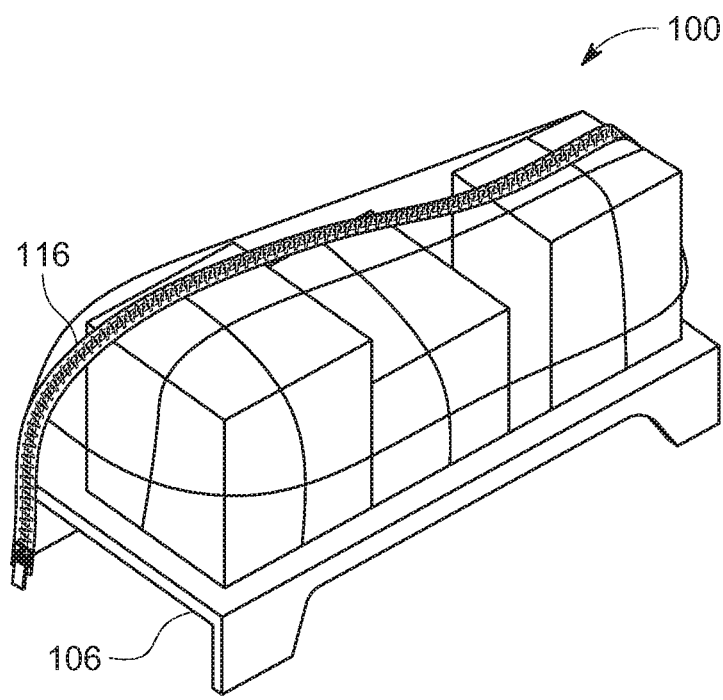
FIG. 20A illustrates a diagrammatic perspective view of the aerodynamic encasement, in accordance with yet another embodiment of the present disclosure.
Figure 20B:
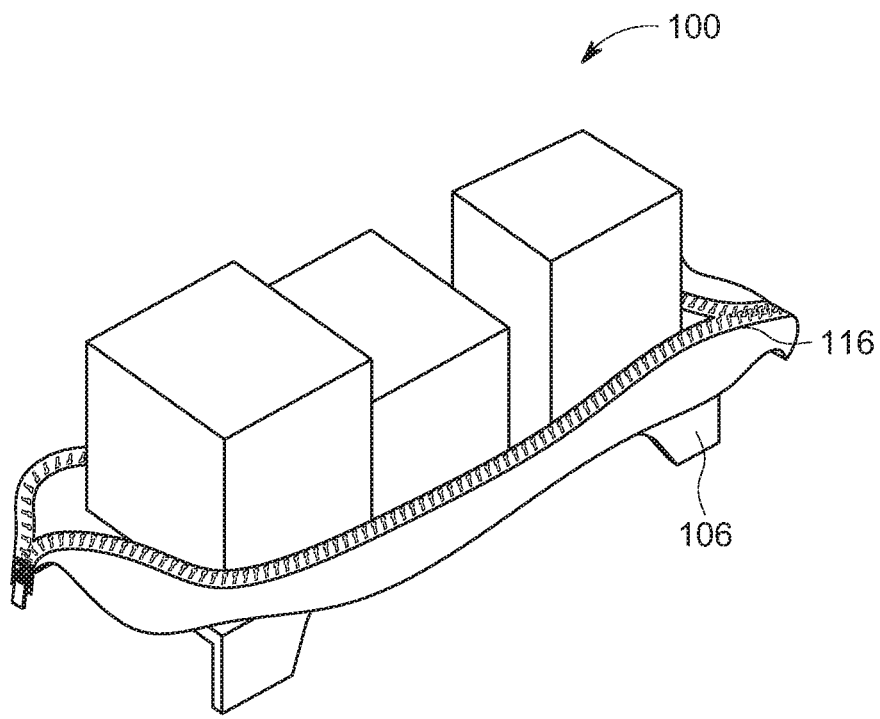
FIG. 20B depicts an exemplary implementation of the aerodynamic encasement of FIG. 20A for loading thereof.

FIGS. 14A-14B illustrate the aviation cargo aerodynamic encasement 100, in accordance with another embodiment of the present disclosure. Herein, the fairing 116 has an opening on a side thereof from which the platform 106 may be loaded. FIGS. 15A-15B illustrate the aviation cargo aerodynamic encasement 100, in accordance with yet another embodiment of the present disclosure. Herein, the fairing 116 may be formed of two sections which may be hinged together, so as to be disposed between an open position to allow loading of the platform and a closed position to form the aerodynamic encasement. FIGS. 16A-16B illustrate the aviation cargo aerodynamic encasement 100, in accordance with yet another embodiment of the present disclosure. Herein, the fairing 116 may have two front sections hinged at ends of a larger back section, in which the two sections can be disposed in respective open positions to allow loading of the platform and their closed positions to form the aerodynamic encasement. FIGS. 17A-17B illustrate the aviation cargo aerodynamic encasement 100, in accordance with yet another embodiment of the present disclosure. Herein, the fairing 116 may have two sections which may be pivoted opposite to each other to provide space for receiving the platform 106 and may be pivoted back towards each other to form the encasement. Herein, an upper section of the fairing 116 may be pivotally coupled with a lower section thereof, such that the said upper section may be pivoted (lifted up) to allow for receiving of the platform 106 and again pivoted back (pushed down) to form the encasement. FIGS. 18A-18B and FIGS. 19A-19B illustrate the aviation cargo aerodynamic encasement 100, in accordance with yet another embodiment of the present disclosure. Herein, the fairing may provide vertical support structures between which the platform 106 is supported, and the fairing 116 is covered by another structure to form the encasement. FIGS. 20A-20B illustrate the aviation cargo aerodynamic encasement 100, in accordance with yet another embodiment of the present disclosure. Herein, the fairing 116 is in the form of a bag with a zip like fastener which may be opened to allow receiving of the platform 106 and closed to form the encasement. A hard-shell fairing as previously described would thereafter encase the bag forming the encasement.

In one or more embodiments, the aerodynamic encasement 100 of the present invention may include communication and networking systems that enable the aerodynamic encasement 100 to determine its location and to communicate that location to a central management facility/software system and/or a nearby UAV or ground/warehouse crew. In one embodiment, the aerodynamic encasement includes the ability to gain its geographic location using satellite-based positioning systems. In another embodiment, the aerodynamic encasement can use position locating systems of vehicles or transport systems to which the aerodynamic encasement is attached. Further, radiofrequency (RF) transmission of a known position and triangulation/trilateration can be used in other embodiments. For example, the aerodynamic encasement 100 could be resting within a ground-based landing and takeoff depot that is designed, at least in part, to store the aerodynamic encasements 100 of the present invention. Such depots contain a plurality of beacons, the precise locations of which are known and fixed. In this circumstance, the aerodynamic encasement 100 can determine its precise location via short-range beacons communicating with the depot beacons, using this triangulation/trilateration approach.

In one or more embodiments, the aerodynamic encasement 100 may also include a system to assist a UAV to determine its precise location and/or orientation to enable the aircraft to align with the aerodynamic encasement 100 so that it can be properly coupled to the UAV. For example, visual and similar marker-based systems can be incorporated onto the exterior of the aerodynamic encasement 100 to aid in precise locating and positioning. As a UAV approaches the aerodynamic encasement 100 for retrieval or positioning, markers placed at key locations on the aerodynamic encasement 100 can aid external systems to precisely determine the aerodynamic encasement's location and orientation as an aid to navigation and alignment.

In one or more embodiments, the aerodynamic encasement 100 of the present invention can also include the ability to communicate to other devices wirelessly via several optionally-populated transceivers, including one or more of 802.11 (i.e. "Wi-Fi"), cellular data networks (e.g. "3G", "4G/LTE", etc.), satellite communications (e.g. Iridium), point-to-point radio (RF) modems, mesh-networked radio (RF) modems, Bluetooth, and the like. These communication devices can be encased within the body of the aerodynamic encasement 100 and optionally within an epoxy mass that is attached to the fairing 116 of the aerodynamic encasement 100. Encasing these devices in this way protects them from weather elements, accidental strikes, and theft. Additionally, custom enclosures or enclosures adapted from other purposes might serve to affix communication devices to the aerodynamic encasement 100 and shelter them from the elements.

In an embodiment, the aerodynamic encasement 100 transmits data relating to its identification, location, cargo load status and/or orientation via the internet to many possible locations, including to a central server, to other connected aerodynamic encasements, to aircraft and transport systems, to ground control, to ground staff, and to monitoring systems, automated planning systems, UAVs, etc. In another embodiment, the aerodynamic encasement 100 can monitor and report its load capacity. As various components are added or removed, the aerodynamic encasement's 100 cargo arrangement can be optimized for transport. Moreover, the communication system described above can be used to enable a "chain of custody". For example, one party could be delivering a certain aerodynamic encasement 100 via an aircraft, a second party could be the owner of cargo in that aerodynamic encasement 100, and a third party could be ready to accept delivery of that aerodynamic encasement 100. As the aircraft carrying the aerodynamic encasement 100 approaches its destination, sending its location to a server, the server could inform the third party to be ready to accept delivery. Then once the aircraft lands, the third party could accept the delivery, confirming its acceptance electronically with the server, at which time the server informs the aircraft or the first party as well as the aerodynamic encasement owner (the second party) that the aerodynamic encasement 100 has been accepted. In some embodiments of the present invention, the third-party is a depot as discussed earlier.

Figure 21:
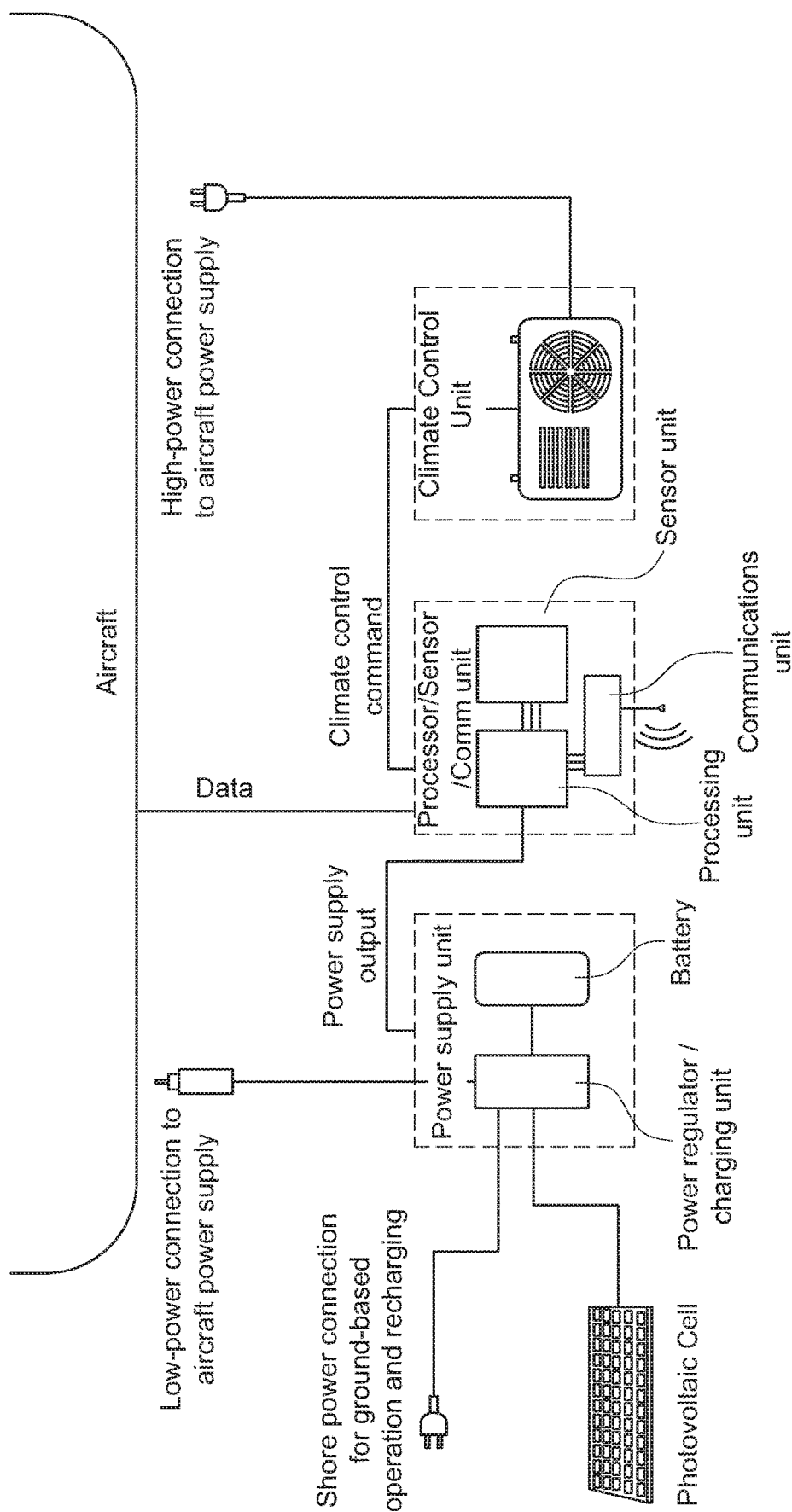
FIG. 21 illustrates a schematic diagram of the aerodynamic encasement, in accordance with one or more embodiments of the present disclosure.
Figure 22:
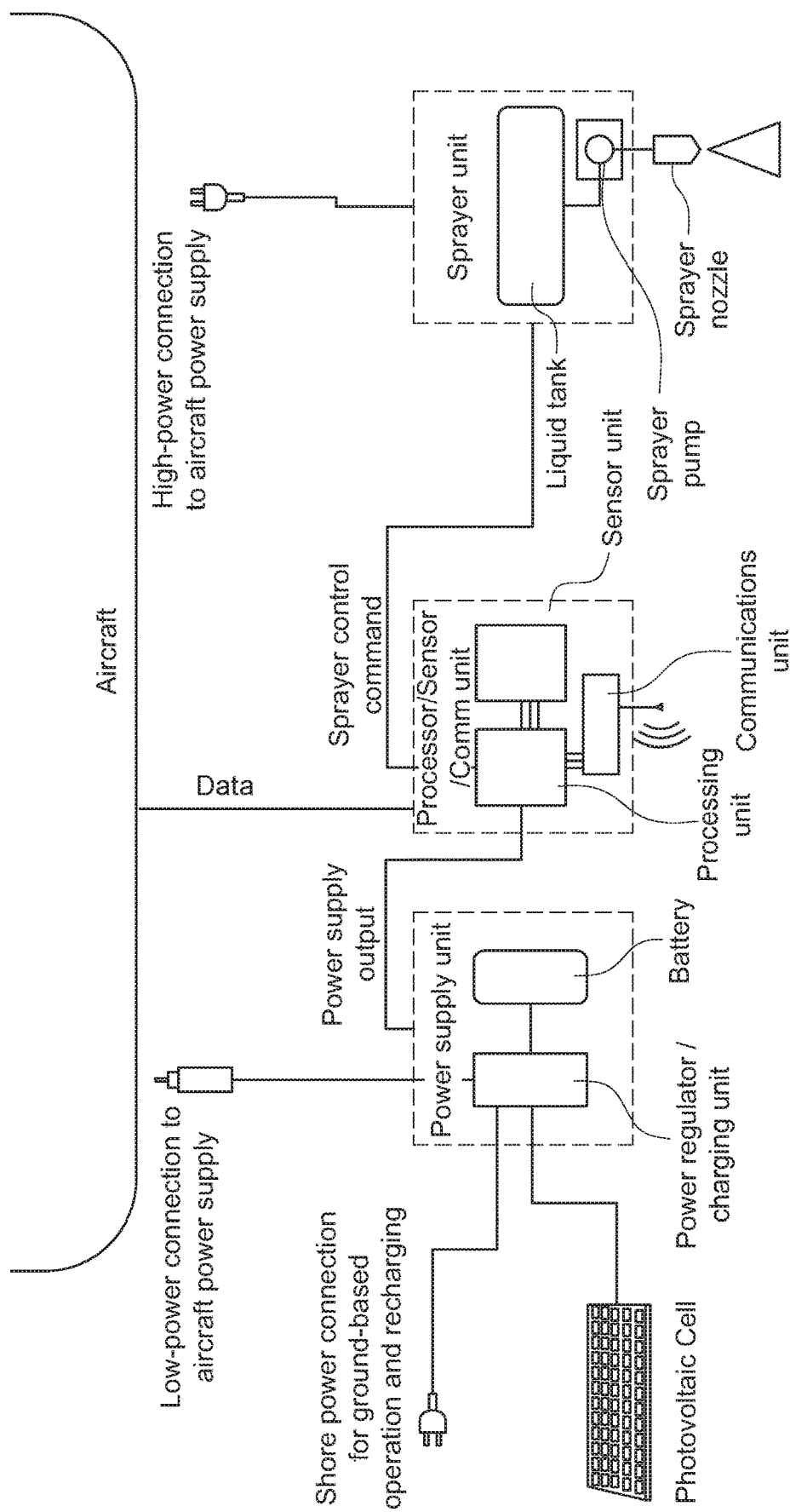
FIG. 22 illustrates a schematic diagram of the aerodynamic encasement, in accordance with one or more embodiments of the present disclosure.

In one or more embodiments, as schematically illustrated in FIG. 21, an onboard battery pack provides electrical power for the aerodynamic encasement's 100 onboard devices. The battery can be charged in several possible ways, including a photovoltaic ("solar power") cell that is mounted on top of the aerodynamic encasement or is incorporated into the external composite skin of the aerodynamic encasement, a power connection to the UAV that is connected upon pick-up and engagement with the UAV, and/or a shore-power connection that is connected to ground infrastructure. As illustrated in FIG. 21, the aerodynamic encasement 100 of the present invention can also incorporate a climate control unit (i.e. temperature control system) for climate-sensitive cargo. A processing unit with a temperature probe placed within the aerodynamic encasement 100 near climate-sensitive cargo informs a software system managing heating and cooling devices within the aerodynamic encasement 100 to maintain a preset temperature range. The processor is also capable of logging the time-history of temperatures while the cargo is in the aerodynamic encasement 100, providing an auditable temperature history of the cargo for example for "cold chain" applications. Other sensors are also contemplated. Data with respect to sensors incorporated within, or associated with, the aerodynamic encasement 100 can be transferred to the UAV via hardline cable or wirelessly. In yet another embodiment, as schematically illustrated in FIG. 22, the processing unit commands a sprayer unit to spray liquid from the aerodynamic encasement 100. The sprayer unit consists of a liquid supply tank, a pump, a nozzle, and piping. The unit is commanded to spray liquids over certain areas in-flight. The liquid could be water (for e.g. firefighting), flame retardant, fertilizer (for e.g. farming) or pesticide, among others.

In one or more embodiments, the aerodynamic encasement 100 includes the ability to detach from the aerial vehicle during flight in instances of emergency or, in other situations, in which landing the aircraft (UAV) is not feasible, detach and deploy a parachute. In yet another scenario the aerodynamic encasement 100 is able to be lowered from the hovering aircraft at a height and released so that the aircraft would not have to land to release the aerodynamic encasement 100. For this purpose, the aerodynamic encasement 100 may include a parachute system (now shown) that enables the aerodynamic encasement 100 to fall at a safe velocity if detached from the UAV mid-flight. The parachute can either be deployed via the use of a pull-cord attached to the UAV or via an onboard system that triggers parachute deployment (via e.g. a servo-actuator or pyrotechnic charge). The onboard system can be programmed to deploy the parachute either automatically (using e.g. onboard inertial sensors to detect freefall or barometric pressure sensors to determine altitude above mean sea level) or via a wireless communication device in communication with the UAV or ground control infrastructure. Similarly, the aerodynamic encasement 100 can be configured to carry water or a fire retardant that can be dumped/vented. In this type of configuration, the UAV can be piloted into austere conditions inaccessible by manned aircraft in support of ground personnel.

In addition, the aerodynamic encasement 100 of the present invention can incorporate other sensors that measure various aspects of the operational state the aerodynamic encasement 100 itself. For example, the aerodynamic encasement 100 can include inertial, barometric pressure, or magnetic sensors that enable the aerodynamic encasement 100 to measure its state of movement, orientation, altitude, and/or magnetic heading; Internal proximity or imaging sensors (e.g., sonar, time-of-flight, infrared, cameras, etc.) that, together with software, enable the aerodynamic encasement 100 to determine the amount, size or type of payload in the cargo area thereof, occupied volume, remaining capacity, etc.; force or pressure transducers at the points of ground contact that measure the aerodynamic encasement's 100 current overall weight and weight distribution; electrical sensors that measure the state of charge, voltage, current, and power of the aerodynamic encasement's 100 battery and/or battery charging system; and; temperature and relative humidity sensors that measure the ambient atmospheric conditions inside and/or outside the aerodynamic encasement 100; time-of-flight, beacon, or ranging sensors that enable the aerodynamic encasement's 100 location and orientation relative to the UAV to be determined with sufficient accuracy to enable navigation of the UAV to the aerodynamic encasement 100 for pickup; visual markers, recognizable patterns or logos, or fiducials that can be located by camera(s) on-board the UAV, to enable the UAV to determine the aerodynamic encasement's 100 location and orientation with sufficient accuracy for the UAV to navigate to the aerodynamic encasement 100 for pickup; retroreflective patterned surfaces on the aerodynamic encasement 100 that enable a scanning laser rangefinder ("LIDAR") on-board the UAV to determine the aerodynamic encasement's 100 location and orientation with sufficient accuracy for the UAV to navigate to the aerodynamic encasement 100 for pickup; multiple precise satellite-based positioning system modules positioned to enable the determination of heading/orientation; and the like.

Figure 23:
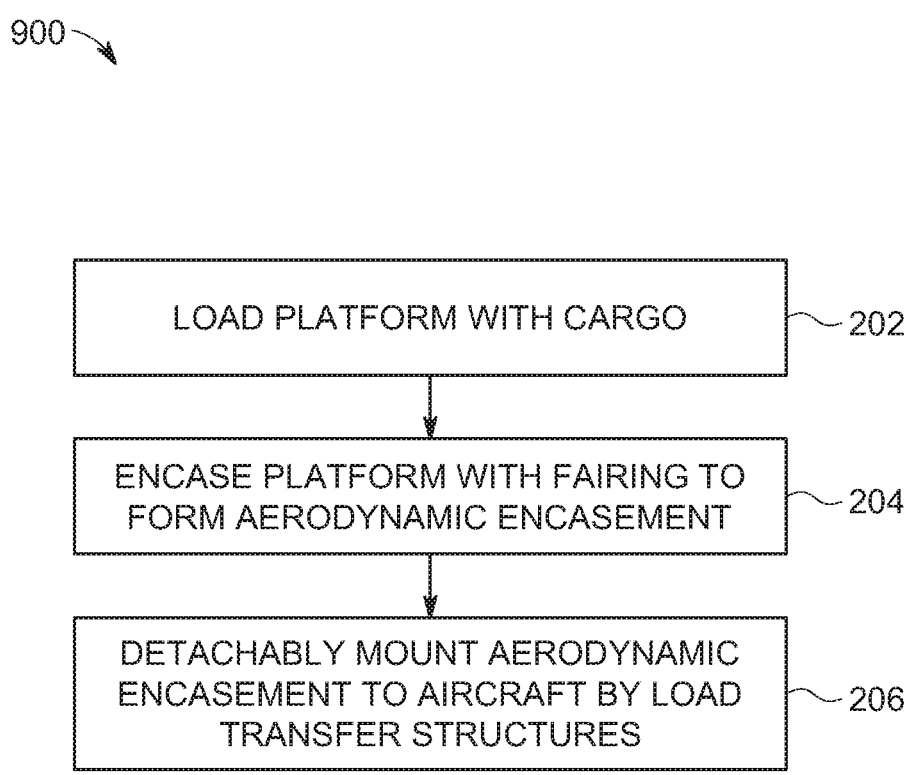
FIG. 23 illustrate a flowchart listing steps involved in a method for modular aviation cargo transport, in accordance with various embodiments of the present disclosure.

The present description relates to the method for modular aviation cargo transport as described above. The various embodiments and variants disclosed above apply mutatis mutandis to the method for modular aviation cargo transport. FIG. 23 provides a flowchart 200 listing steps involved in the method for modular aviation cargo transport. At step 202, the method includes loading a platform (such as, the platform 106) with cargo, the platform 106 having a planar upper surface 108 configured to accept the cargo and a lower surface 110 wherein the lower surface 110 includes two or more ground supports 112 displacing a portion of the platform 106 from contact with a supporting surface and wherein the platform 106 includes two or more load transfer structures 132. At step 204, the method includes encasing the platform 106 with a fairing (such as, the fairing 116), the fairing 116 configured to detachably couple to the platform 106 wherein the fairing 116, when coupled to the platform 106, forms an aerodynamic encasement. At step 206, the method includes detachably mounting the aerodynamic encasement to an aircraft by the two or more load transfer structures 132.

The method further includes displacing, by the ground supports 112, the lower surface 110 of the platform 106 away the supporting surface sufficient to accept a lifting mechanism (such as, the lifting mechanism 114). The method further includes accepting, by the two or more load transfer structures 132, a grasping mechanism wherein the grasping mechanism is configured to raise the aerodynamic encasement to the aircraft. The method further includes mounting the aerodynamic encasement to the aircraft. Herein, the fairing 116 includes a front portion 118 and a rear portion 120, and the method further includes joining the front portion 118 to the rear portion 120 to encase the platform 106. Responsive to joining the front portion 118 and the rear portion 120, the method further includes coupling the fairing 116 to the platform 106. Herein, the lower surface 110 of the platform 106 forms an exterior surface of the aerodynamic encasement. Further, the fairing 116 is a singular component configured to cover the platform 106. The method further includes detaching a detachable side panel (such as, the detachable side panel 140) from the fairing 116. The method further includes laterally accepting the platform 106 into the fairing 116 and reattaching the detachable side panel 140 to form the aerodynamic encasement.

The aerodynamic encasement 100 of the present invention can accept a load from any direction (except from below) that stands off the ground enough to accept the tines of a pallet jack for loading of the cargo therefrom. After loading, the aerodynamic encasement 100 is formed by fitting a fairing over the platform. Thereafter, the aerodynamic encasement 100 is attached to an aircraft by means as discussed. The aerodynamic encasement 100 of the present invention has a fully enclosed form with flat bottom (having, in one embodiment, a dimension of about 24 inches by 72 inches, for example) such that in can be repositioned with a pallet jack if required and loaded as a unit into an intermodal container. The modular nature of the aerodynamic encasement 100 enables cargo to be quickly loaded and unloaded in its non-encased state and yet swiftly attached to an aircraft for transportation and deployment.

While there have been described above the principles of the present invention in conjunction with an aviation cargo aerodynamic encasement and a method for modular aviation cargo transport, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. A modular aerial cargo aerodynamic encasement, comprising:
   a platform having a planar upper surface configured to accept cargo and a lower surface, wherein the lower surface includes two or more ground supports displacing a portion of the platform from contact with a supporting surface, and wherein the platform includes two or more load transfer structures and is constructed from aerospace material selected from a group consisting of aluminum, titanium, carbon fiber, and composite material; and
   a fairing configured to detachably couple to the platform, wherein the fairing is a singular component and when coupled to the platform covers the platform forming an aerodynamic encasement, and wherein the aerodynamic encasement is detachably mountable to an aircraft by the two or more load transfer structures.

2. The modular aerial cargo aerodynamic encasement of claim 1, wherein the ground supports are configured to displace the lower surface of the platform away the supporting surface sufficient to accept a lifting mechanism.

3. The modular aerial cargo aerodynamic encasement of claim 1, wherein the planar upper surface includes a plurality of tie down fixtures.

4. The modular aerial cargo aerodynamic encasement of claim 1, wherein the two or more ground supports are aerodynamically shaped.

5. The modular aerial cargo aerodynamic encasement of claim 1, wherein the two or more load transfer structures include a guide configured to accept a grasping mechanism.

6. The modular aerial cargo aerodynamic encasement of claim 5, wherein the grasping mechanism is configured to raise the aerodynamic encasement to the aircraft whereby the aerodynamic encasement is mounted to the aircraft.

7. The modular aerial cargo aerodynamic encasement of claim 1, wherein the platform includes a honeycomb structure.

8. The modular aerial cargo aerodynamic encasement of claim 1, wherein the platform includes a corrugated structure.

9. The modular aerial cargo aerodynamic encasement of claim 1, wherein the fairing includes a front portion and a rear portion that join to encase the platform.

10. The modular aerial cargo aerodynamic encasement of claim 9, wherein the front portion and the rear portion are coupled to each other and to the platform.

11. The modular aerial cargo aerodynamic encasement of claim 1, wherein the lower surface of the platform forms an exterior surface of the aerodynamic encasement.

12. The modular aerial cargo aerodynamic encasement of claim 1, wherein the fairing is configured to withstand aerodynamic forces exerted on the aerodynamic encasement up to 300 mph.

13. The modular aerial cargo aerodynamic encasement of claim 1, wherein the fairing includes a detachable side panel configured to laterally accept the platform to form the aerodynamic encasement.

14. A method for modular aerial cargo transport, comprising:
   loading a platform with cargo, the platform having a planar upper surface configured to accept the cargo and a lower surface wherein the lower surface includes two or more ground supports displacing a portion of the platform from contact with a supporting surface and wherein the platform includes two or more load transfer structures and is constructed from aerospace material selected from a group consisting of aluminum, titanium, carbon fiber, and composite material;
   encasing the platform with a fairing, the fairing configured to detachably couple to the platform wherein the fairing, when coupled to the platform, forms an aerodynamic encasement and wherein the fairing is a singular component configured to cover the platform; and detachably mounting the aerodynamic encasement to an exterior of an aircraft by the two or more load transfer structures.

15. The method for modular aerial cargo transport according to claim 14, further comprising displacing, by the ground supports, the lower surface of the platform away the supporting surface sufficient to accept a lifting mechanism.

16. The method for modular aerial cargo transport according to claim 14, further comprising accepting, by the two or more load transfer structures, a grasping mechanism wherein the grasping mechanism is configured to raise the aerodynamic encasement to the aircraft.

17. The method for modular aerial cargo transport according to claim 16, further comprising mounting the aerodynamic encasement to the aircraft.

18. The method for modular aerial cargo transport according to claim 14, wherein the fairing includes a front portion and a rear portion and further comprising joining the front portion to the rear portion to encase the platform.

19. The method for modular aerial cargo transport according to claim 18, responsive to joining the front portion and the rear portion, further comprising coupling the fairing to the platform.

20. The method for modular aviation cargo transport according to claim 14, wherein the lower surface of the platform forms an exterior surface of the aerodynamic encasement.

21. The method for modular aerial cargo transport according to claim 14, further comprising detaching a detachable side panel from the fairing.

22. The method for modular aerial cargo transport according to claim 21, further comprising laterally accepting the platform into the fairing and reattaching the detachable side panel to form the aerodynamic encasement.

* * * * *